(12) United States Patent
Salter et al.

(10) Patent No.: US 11,878,654 B2
(45) Date of Patent: Jan. 23, 2024

(54) SYSTEM FOR SENSING A LIVING BEING PROXIMATE TO A VEHICLE

(71) Applicant: Ford Global Technologies, LLC, Dearborn, MI (US)

(72) Inventors: Stuart C. Salter, White Lake, MI (US); Hussein Berry, Dearborn, MI (US); Marguerite Lynn Kimball, Brighton, MI (US); Annette Lynn Huebner, Highland, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 464 days.

(21) Appl. No.: 17/229,428

(22) Filed: Apr. 13, 2021

(65) Prior Publication Data

US 2022/0324415 A1 Oct. 13, 2022

(51) Int. Cl.
*G06F 17/00* (2019.01)
*B60R 25/31* (2013.01)
(Continued)

(52) U.S. Cl.
CPC ............. *B60R 25/31* (2013.01); *B60J 5/102* (2013.01); *B60P 1/435* (2013.01); *B60R 25/305* (2013.01);
(Continued)

(58) Field of Classification Search
CPC ........ B60R 25/31; B60R 25/305; B60J 5/102; B60J 5/103; B60P 1/435; G01S 13/04;
(Continued)

(56) References Cited

U.S. PATENT DOCUMENTS

| 8,174,146 B2 | 5/2012 | Cheal et al. |
| 8,838,333 B2 | 9/2014 | Cheal et al. |

(Continued)

FOREIGN PATENT DOCUMENTS

| DE | 102014215293 A1 | 2/2016 |
| WO | 2018111225 A1 | 6/2018 |

OTHER PUBLICATIONS

Braunmanual (Year: 2018).*

*Primary Examiner* — Ronnie M Mancho
(74) *Attorney, Agent, or Firm* — Vichit Chea; Price Heneveld LLP

(57) ABSTRACT

A system for a vehicle includes a rear gate assembly of the vehicle that includes a closure panel operable to pivot vehicle-downward from a closed position to an open position. The system also includes a support feature coupled to the closure panel and operable to move relative to the closure panel between a retracted position and a deployed position. In the open position of the closure panel, the position of the support feature in the deployed position is further vehicle-downward than the position of the support feature in the retracted position. The system also includes a sensing system of the vehicle that detects a living being proximate to the rear gate assembly. The system further includes a controller that authenticates an identity and determines a position of the living being based on data received from the sensing system and prompts movement of the support feature from the retracted position to the deployed position based on the authenticated identity and determined position of the living being.

20 Claims, 19 Drawing Sheets

(51) Int. Cl.
*B60P 1/43* (2006.01)
*B60R 25/30* (2013.01)
*G01S 13/04* (2006.01)
*B60J 5/10* (2006.01)
*G06V 20/56* (2022.01)
*G06V 40/10* (2022.01)
*G06V 40/20* (2022.01)

(52) U.S. Cl.
CPC .............. *G01S 13/04* (2013.01); *G06V 20/56* (2022.01); *G06V 40/10* (2022.01); *G06V 40/20* (2022.01)

(58) Field of Classification Search
CPC ......... G01S 13/931; G01S 2013/93272; G01S 7/41; G06V 20/56; G06V 40/10; G06V 40/20
USPC .......................................................... 701/49
See application file for complete search history.

(56) References Cited

U.S. PATENT DOCUMENTS

| | | | |
|---|---|---|---|
| 9,097,055 B2 | 8/2015 | Cheal et al. | |
| 9,308,802 B2 | 4/2016 | Warburton et al. | |
| 9,315,145 B2 * | 4/2016 | Salter | B60Q 1/307 |
| 9,440,579 B2 * | 9/2016 | Salter | B60Q 1/2661 |
| 9,636,978 B2 | 5/2017 | Warburton et al. | |
| 9,676,258 B2 | 6/2017 | Warburton et al. | |
| 9,688,192 B2 * | 6/2017 | Salter | B60Q 3/68 |
| 9,840,193 B1 * | 12/2017 | Chea | B60Q 3/68 |
| 9,862,325 B2 * | 1/2018 | Huebner | B60R 7/02 |
| 9,909,347 B2 | 3/2018 | Warburton et al. | |
| 10,048,113 B2 * | 8/2018 | Salter | G01G 19/08 |
| 10,059,238 B1 * | 8/2018 | Salter | G03B 21/56 |
| 10,113,351 B2 | 10/2018 | Banvait et al. | |
| 10,391,943 B2 * | 8/2019 | Salter | B60Q 1/0076 |
| 10,422,501 B2 * | 9/2019 | Salter | B60Q 1/32 |
| 10,457,196 B1 * | 10/2019 | Salter | F21V 23/003 |
| 10,483,678 B2 * | 11/2019 | Buttolo | B60L 53/16 |
| 10,744,838 B2 | 8/2020 | Feit | |
| 11,247,635 B1 * | 2/2022 | Salter | B60R 25/24 |
| 11,378,440 B2 * | 7/2022 | Salter | G01G 19/12 |
| 11,440,462 B1 * | 9/2022 | Salter | B60Q 1/30 |
| 11,492,836 B2 * | 11/2022 | Salter | E05F 15/71 |
| 11,524,629 B2 * | 12/2022 | Salter | G08G 1/166 |
| 11,535,091 B2 * | 12/2022 | Salter | B60J 5/101 |
| 11,701,950 B2 * | 7/2023 | Salter | B62D 33/0207 296/100.03 |
| 2015/0291086 A1 * | 10/2015 | Salter | B60Q 1/307 362/485 |
| 2018/0163942 A1 * | 6/2018 | Salter | F21S 43/14 |
| 2018/0287287 A1 * | 10/2018 | Buttolo | B60R 16/03 |
| 2019/0106058 A1 * | 4/2019 | Salter | B60Q 1/2665 |
| 2019/0176679 A1 * | 6/2019 | Salter | B60Q 3/217 |
| 2019/0315267 A1 * | 10/2019 | Salter | B60Q 1/324 |
| 2020/0130702 A1 | 4/2020 | Ferreira et al. | |
| 2022/0227356 A1 * | 7/2022 | Gould | B60W 50/14 |
| 2022/0236101 A1 * | 7/2022 | Salter | G01G 23/32 |
| 2022/0289103 A1 * | 9/2022 | Salter | B60Q 1/0011 |
| 2022/0290484 A1 * | 9/2022 | Salter | B60J 5/047 |
| 2022/0314888 A1 * | 10/2022 | Glickman | B60D 1/01 |
| 2022/0324308 A1 * | 10/2022 | Salter | E05F 15/73 |
| 2022/0324309 A1 * | 10/2022 | Salter | E05F 15/71 |
| 2022/0324415 A1 * | 10/2022 | Salter | B60R 25/305 |
| 2022/0325569 A1 * | 10/2022 | Salter | E05F 15/43 |
| 2022/0327873 A1 * | 10/2022 | Salter | G07C 5/0833 |
| 2022/0379780 A1 * | 12/2022 | Salter | B60N 2/3095 |
| 2023/0008195 A1 * | 1/2023 | Salter | B62D 33/0273 |
| 2023/0243955 A1 * | 8/2023 | Salter | G01S 13/0209 342/21 |

* cited by examiner

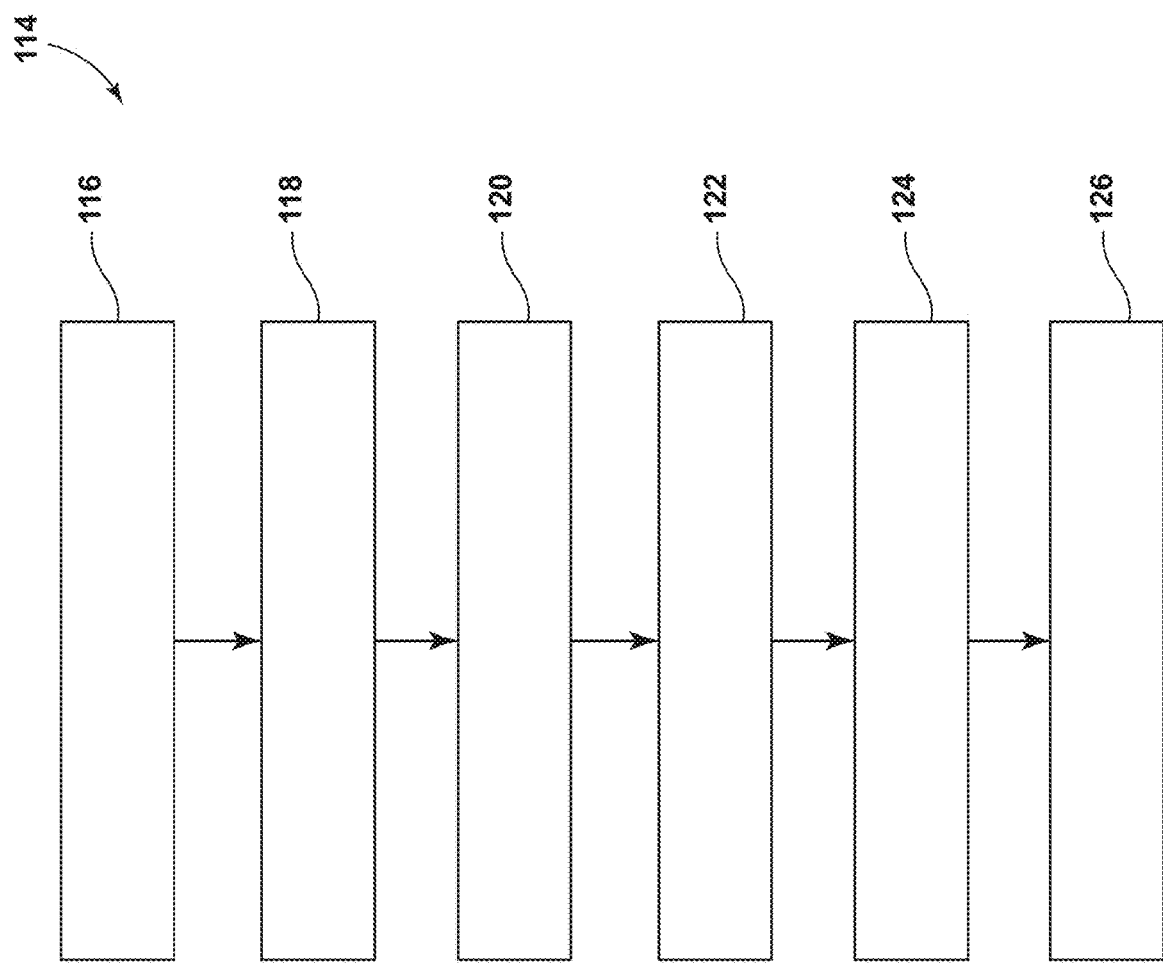

SYSTEM FOR SENSING A LIVING BEING PROXIMATE TO A VEHICLE

FIELD OF THE DISCLOSURE

The present invention generally relates to a system for a vehicle. The present invention more particularly relates to a system for sensing a living being proximate to a vehicle.

BACKGROUND OF THE DISCLOSURE

Vehicles typically include closure panels that provide access to the vehicle. A system that controls operation of vehicle closure panels based on a variety of conditions may be desired.

SUMMARY OF THE DISCLOSURE

According to a first aspect of the present disclosure, a system for a vehicle includes a rear gate assembly of the vehicle that includes a closure panel operable to pivot vehicle-downward from a closed position to an open position. The system also includes a support feature coupled to the closure panel and operable to move relative to the closure panel between a retracted position and a deployed position. In the open position of the closure panel, the position of the support feature in the deployed position is further vehicle-downward than the position of the support feature in the retracted position. The system also includes a sensing system of the vehicle that detects a living being proximate to the rear gate assembly. The system further includes a controller that authenticates an identity and determines a position of the living being based on data received from the sensing system and prompts movement of the support feature from the retracted position to the deployed position based on the authenticated identity and determined position of the living being.

Embodiments of the first aspect of the present disclosure can include any one or a combination of the following features:
- the support feature includes a ramp that extends out of the closure panel from the retracted position to the deployed position;
- the rear gate assembly includes a top gate panel that is operable to pivot vehicle-upward from a closed position to an open position and a bottom gate panel, wherein the closure panel is the bottom gate panel;
- the sensing system includes at least one radar sensor coupled to the top gate panel, wherein the controller determines the position of the living being based on data received from the at least one radar sensor;
- the sensing system includes an imager coupled to the rear gate assembly, wherein the controller authenticates the identity of the living being based on data received from the imager;
- the sensing system includes an imager disposed within a cabin of the vehicle, wherein the controller authenticates the identity of the living being based on data received from the imager; and
- the controller further prompts movement of the support feature from the deployed position to the retracted position based on the position of the living being.

According to a second aspect of the present disclosure, a system for a vehicle includes a closure panel operable to pivot vehicle-downward from a closed position to an open position. The system also includes a support feature coupled to the closure panel and operable to move relative to the closure panel between a retracted position and a deployed position. In the open position of the closure panel, the position of the support feature in the deployed position is further vehicle-downward than the position of the support feature in the retracted position. The system also includes a sensing system of the vehicle that detects a living being proximate to the vehicle. The system further includes a controller that determines a position of the living being based on data received from the sensing system and prompts movement of the support feature from the retracted position to the deployed position based on the determined position of the living being.

Embodiments of the second aspect of the present disclosure can include any one or a combination of the following features:
- the controller prompts movement of the support feature from the retracted position to the deployed position based on the determined position of the living being within a cabin of the vehicle;
- the support feature includes a ramp that extends out of the closure panel from the retracted position to the deployed position;
- the vehicle comprises a rear gate assembly that includes a top gate panel that is operable to pivot vehicle-upward from a closed position to an open position and a bottom gate panel, wherein the closure panel is the bottom gate panel;
- the sensing system includes at least one radar sensor coupled to the top gate panel, wherein the controller determines the position of the living being based on data received from the at least one radar sensor;
- the sensing system includes an imager coupled to the rear gate assembly, wherein the controller determines the position of the living being based on data received from the imager; and
- the sensing system includes an imager disposed within a cabin of the vehicle, wherein the controller determines the position of the living being based on data received from the imager.

According to a third aspect of the present disclosure, a method for providing access to a vehicle includes the steps of detecting a four-legged living being with a sensing system of the vehicle, determining a size of the living being, and operating a rear gate assembly of the vehicle based on the determined size of the living being.

Embodiments of the third aspect of the present disclosure can include any one or a combination of the following steps and features:
- the step of operating a rear gate assembly of the vehicle includes at least one of pivoting a closure panel of the rear gate assembly vehicle-downward from a closed position to an open position, and moving a support feature coupled to the closure panel from a retracted position to a deployed position, wherein, in the open position of the closure panel, the position of the support feature in the deployed position is further vehicle-downward than the position of the support feature in the retracted position;
- the support feature includes a ramp that extends out of the closure panel from the retracted position to the deployed position;
- the rear gate assembly includes a top gate panel operable to pivot about a first pivot axis between open and closed positions, wherein the top gate panel pivots a first direction about the first pivot axis from the closed position to the open position, and a bottom gate panel operable to pivot about a second pivot axis between open and closed positions, wherein the bottom gate panel pivots a second direction about the second pivot axis from the closed position to the open position, wherein the second direction is opposite the first direction, and wherein the sensing system includes at least one radar sensor coupled to the top gate panel;

the step of determining the position of the living being, wherein the rear gate assembly is operated based on the size of the living being and the position of the living being; and the step of detecting a gesture of the living being, wherein the rear gate assembly is operated based on the size of the living being and the detected gesture of the living being.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 13 is a block diagram illustrating a method for providing access to the vehicle, according to one embodiment;

DETAILED DESCRIPTION OF THE PREFERRED EMBODIMENTS

Additional features and advantages of the present disclosure will be set forth in the detailed description that follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
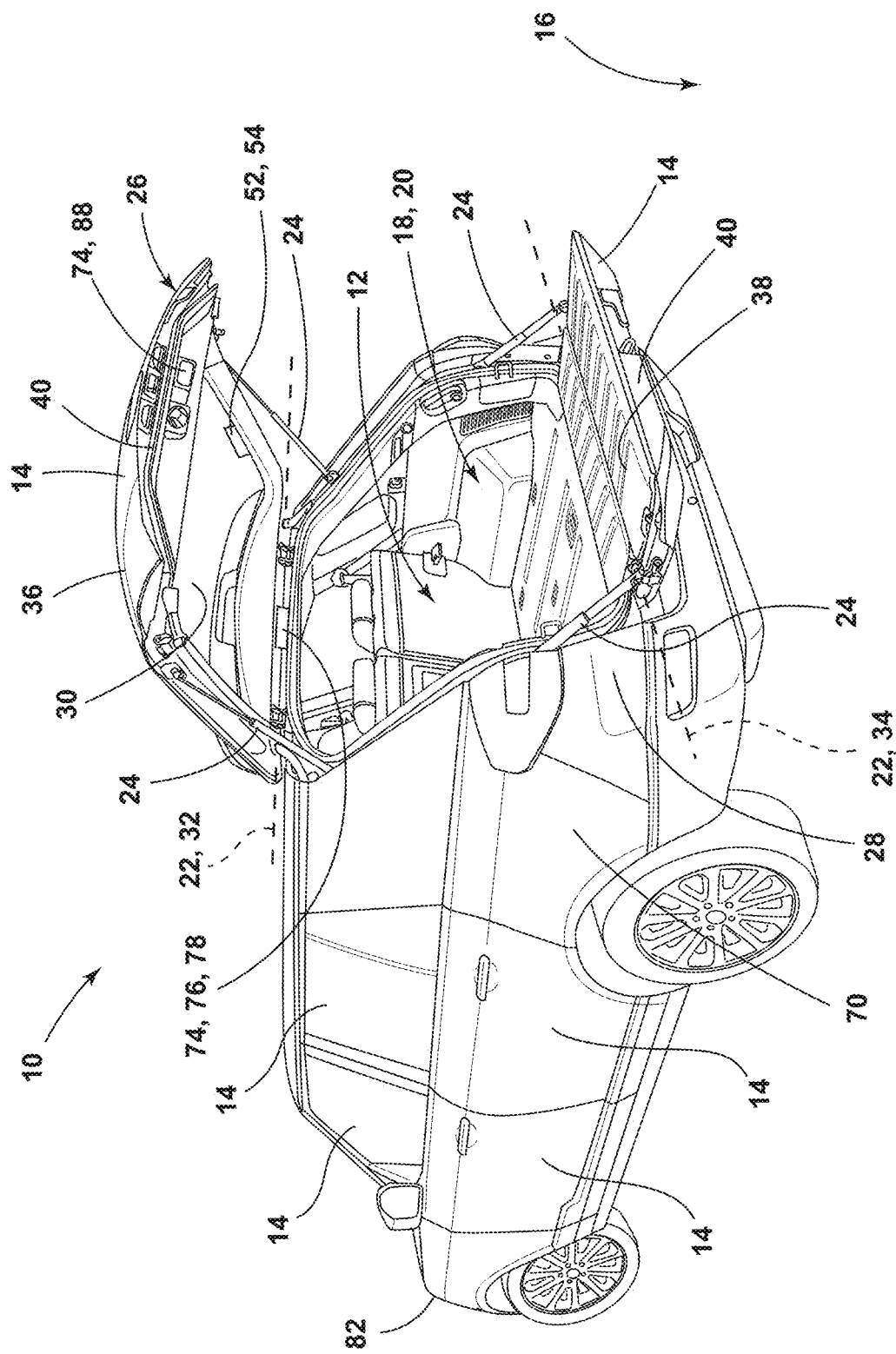
FIG. 1 is a rear perspective view of a vehicle, illustrating a top gate panel and a bottom gate panel of a rear gate assembly of the vehicle in open positions, according to one embodiment.

Referring now to FIGS. 1, 3-6, 10-12B, and 14-17, a vehicle 10 is illustrated. In FIG. 1, the vehicle 10 is an SUV. It is contemplated that the vehicle 10 may be one of a variety of types of vehicles (e.g., SUV, crossover, truck, sedan, van, coupe, etc.), in various embodiments. The vehicle 10 includes a cabin 12 for receiving passengers of the vehicle 10. The vehicle 10 includes a closure panel 14. In various embodiments, the vehicle 10 includes a plurality of closure panels 14. For example, in some implementations, the vehicle 10 may include side doors, windows, sunroofs, rear cargo doors, a trunk door, and/or a tailgate. The closure panel 14 may be operable between open and closed positions. In some embodiments, opening the closure panel 14 may provide access to the cabin 12 of the vehicle 10. In other words, in some embodiments, the cabin 12 of the vehicle 10 may be in fluid communication with an exterior environment 16 of the vehicle 10 if the closure panel 14 is in the open position. In an exemplary embodiment, wherein the closure panel 14 is a window disposed within a driver's side door of the vehicle 10, opening the window provides access to the cabin 12 of the vehicle 10.

In some embodiments, opening the closure panel 14 may provide access to a cargo area 18 of the vehicle 10. The cargo area 18 may be an area of the vehicle 10 for receiving cargo for storage therein. In some implementations, the cargo area 18 may be positioned within the cabin 12 of the vehicle 10. For example, the vehicle 10 may include a rear storage area 20 that is accessible via opening a lift gate of the vehicle 10. In some implementations, the cargo area 18 may be positioned outside of the cabin 12 of the vehicle 10. For example, the vehicle 10 may be a pickup truck, the cargo area 18 may be a bed of the truck, and the closure panel 14 may be a tailgate of the truck that gives access to the bed. In another example, the vehicle 10 may be an electric vehicle, the cargo area 18 may be a front trunk, and the closure panel 14 may be a hood that is moveable to an open position to provide access to the front trunk.

In various embodiments, the closure panel 14 may be operable to pivot about a pivot axis 22 between the open and closed positions. It is contemplated that, in various embodiments, the closure panel 14 may be operable to move between the open and closed positions in at least one of a variety of ways (e.g., translation, sliding, pivoting, etc.). In some embodiments, one or more closure panels 14 of the vehicle 10 may be operable to be power actuated between the open and closed positions via operation of one or more actuators 24 coupled to the vehicle 10. Various types of actuators 24 configured to move one or more closure panels 14 are contemplated (e.g., electric motor, pistons, solenoid, etc.).

In various embodiments, the vehicle 10 includes a rear gate assembly 26. The rear gate assembly 26 may be positioned at a rearward end 28 of the vehicle 10 and may be operable to selectively provide access to at least one of the cabin 12 of the vehicle 10 and the cargo area 18 of the vehicle 10. In some embodiments, the rear gate assembly 26 may include a single closure panel 14. For example, the rear gate assembly 26 may include a single trunk door operable to provide access to a trunk of the vehicle 10 in the open position. In another example, the rear gate assembly 26 may include a single tailgate of a truck operable to provide access to the bed of the truck in the open position. Further, in some examples, the rear gate assembly 26 may include a single-door lift gate that pivots to the open position to provide access to the rear storage area 20 positioned within the cabin 12 of the vehicle 10.

Figure 6:
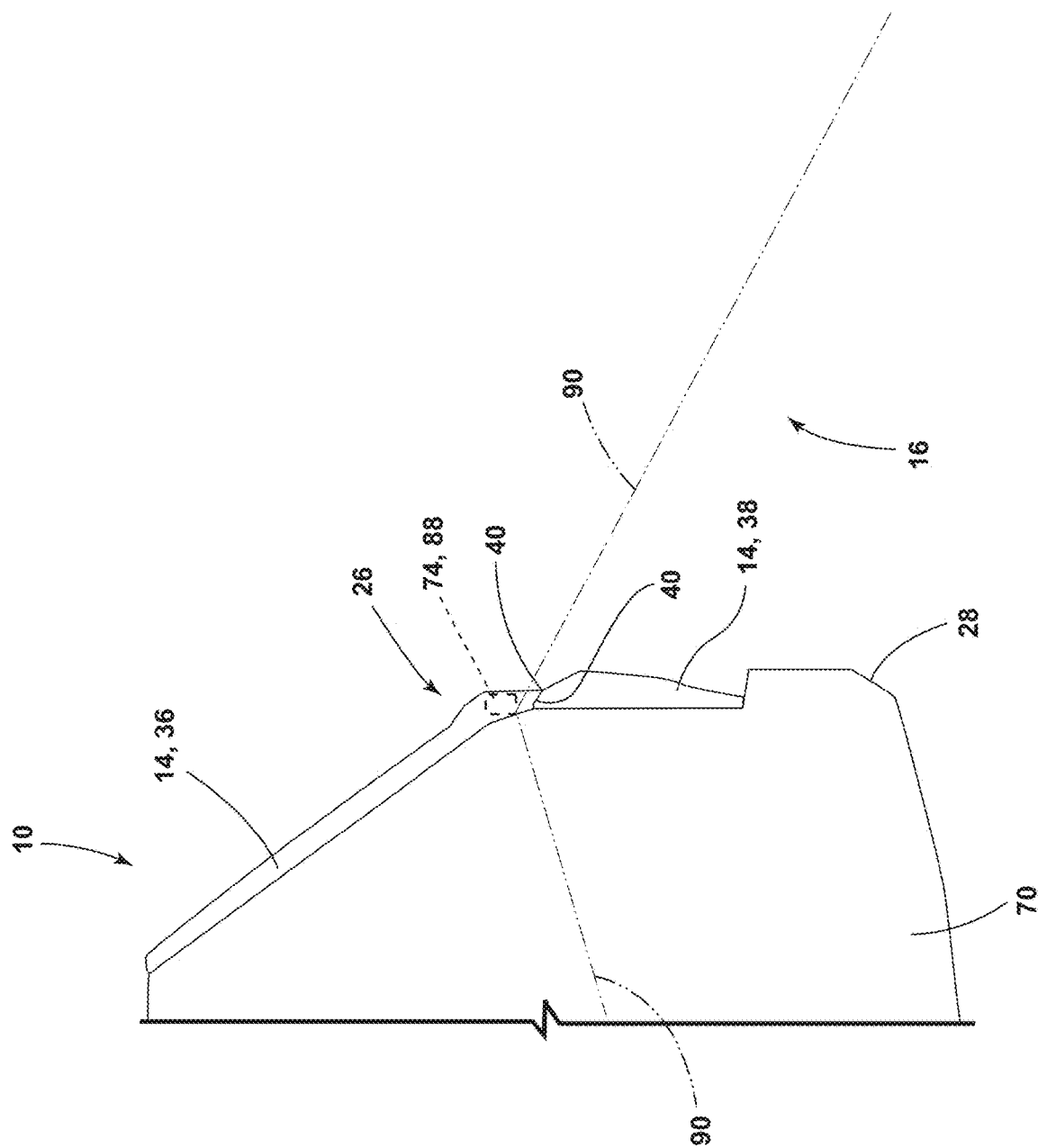
FIG. 6 is an elevational view of the vehicle, illustrating the at least one radar sensor coupled to the top gate panel in the closed position and the bottom gate panel of the rear gate assembly in the closed position, according to one embodiment.

In some embodiments, the rear gate assembly 26 includes a plurality of closure panels 14. For example, in some embodiments, the rear gate assembly 26 may include a first closure panel 14 in the form a lift gate door, and a second closure panel 14 in the form of a rear glass panel 30 coupled to the lift gate door and operable to move relative to the lift gate door between the open and closed positions. In some embodiments, the first closure panel 14 is operable to pivot about a first pivot axis 32 a first direction from the closed position to the open position and the second closure panel 14 is operable to pivot about a second pivot axis 34 a second direction from the closed position to the open position, wherein the second direction is opposite the first direction. For example, in some embodiments, the rear gate assembly 26 includes a top gate panel 36 and a bottom gate panel 38 vehicle-downward of the top gate panel 36, wherein the first closure panel 14 comprises the top gate panel 36 and the second closure panel 14 comprises the bottom gate panel 38. The top gate panel 36 pivots a first direction (vehicle-upward) about the first pivot axis 32 from the closed position to the open position. The bottom gate panel 38 pivots a second direction (vehicle-downward) about the second pivot axis 34 that is opposite the first direction from the closed position to the open position. As illustrated in FIG. 6, the top gate panel 36 and the bottom gate panel 38 are coupled to each other in their respective closed positions.

In various embodiments, the closure panel 14 may include a distal end 40 that is located distally relative to the pivot axis 22 about which the closure panel 14 pivots between open and closed positions. In some implementations, wherein the vehicle 10 includes first and second closure panels 14, the first and second closure panels 14 may each include distal ends 40. For example, as illustrated in FIG. 1, the top gate panel 36 of the rear gate assembly 26 includes the distal end 40 that is located distally from the first pivot axis 32, and the bottom gate panel 38 of the rear gate assembly 26 includes the distal end 40 that is located distally from the second pivot axis 34. As illustrated in FIG. 6, the distal ends 40 of the top and bottom gate panels 36, 38 are proximate and/or in contact with each other in the closed positions of the top and bottom gate panels 36, 38. As further illustrated in FIGS. 1 and 3, the top gate panel 36 of the rear gate assembly 26 includes the rear glass panel 30.

Figure 3:
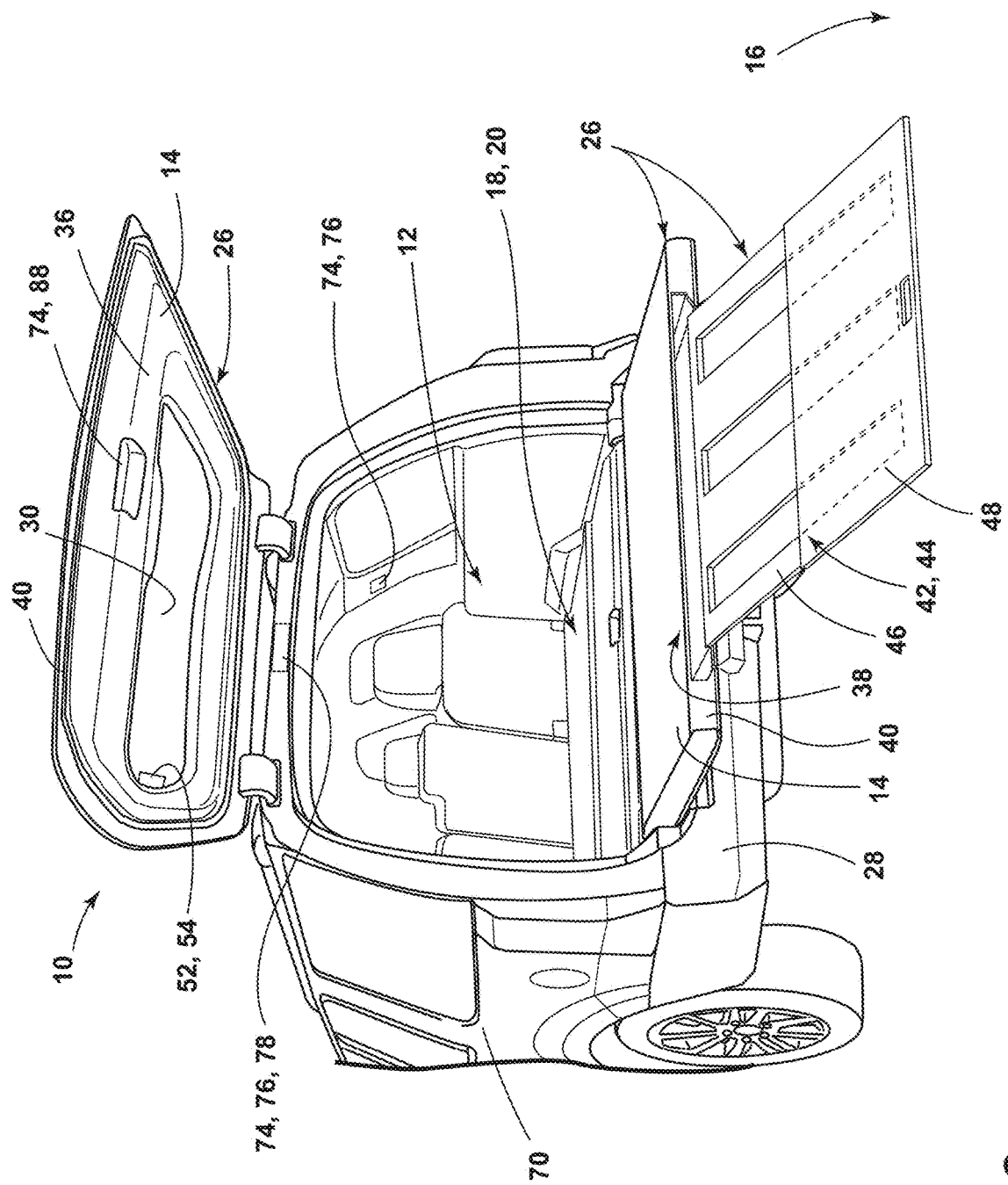
FIG. 3 is a rear perspective view of the vehicle, illustrating a support feature coupled to the bottom gate panel and in a deployed position, according to one embodiment.

Referring now to FIG. 3, a support feature 42 may be coupled to the rear gate assembly 26. The support feature 42 may facilitate cabin 12 and/or cargo area 18 ingress and/or egress. In some embodiments, the support feature 42 is coupled to at least one closure panel 14 of the rear gate assembly 26 that is operable to pivot vehicle-downward from the closed position to the open position (e.g., tailgate of a truck, bottom gate panel 38, etc.). The support feature 42 may be operable to move relative to the at least one closure panel 14 between a retracted position and a deployed position. In various embodiments, the position of the support feature 42 in the deployed position is further vehicle-downward than the position of the support feature 42 in the retracted position. In some implementations, the support feature 42 is concealed while in the retracted position. For example, in some implementations, the support feature 42 is concealed within the at least one closure panel 14 to which the support feature 42 is coupled while in the retracted position. The support feature 42 may be utilized for ingress and egress while in the deployed position.

In the embodiment illustrated in FIG. 3, the support feature 42 is a ramp 44 that extends out of the bottom gate panel 38 from the retracted position to the deployed position. The ramp 44 includes a first section 46 and a second section 48 operable to translate relative to the first section 46. The second section 48 being translatable relative to the first section 46 allows the ramp 44 to be concealed within the bottom gate panel 38 of the rear gate assembly 26 while in the retracted position, yet still extend from the bottom gate panel 38 to the ground in the deployed position. A variety of types of support features 42 operable to facilitate ingress and/or egress are contemplated. For example, in some embodiments, the support feature 42 may be a portion of a tailgate of a truck that is generally flush with the tailgate in the retracted position and forms one or more steps that extend generally downward from the tailgate if the tailgate is in the open position and the support feature 42 is in the deployed position. In some embodiments, the support feature 42 of the vehicle 10 may be operable to be power actuated between the retracted and deployed positions. One or more actuators 24 of the vehicle 10 may be configured to move the support feature 42 between the retracted and deployed positions. Various types of actuators 24 for moving the support feature 42 between the retracted and deployed positions are contemplated.

Figure 2:
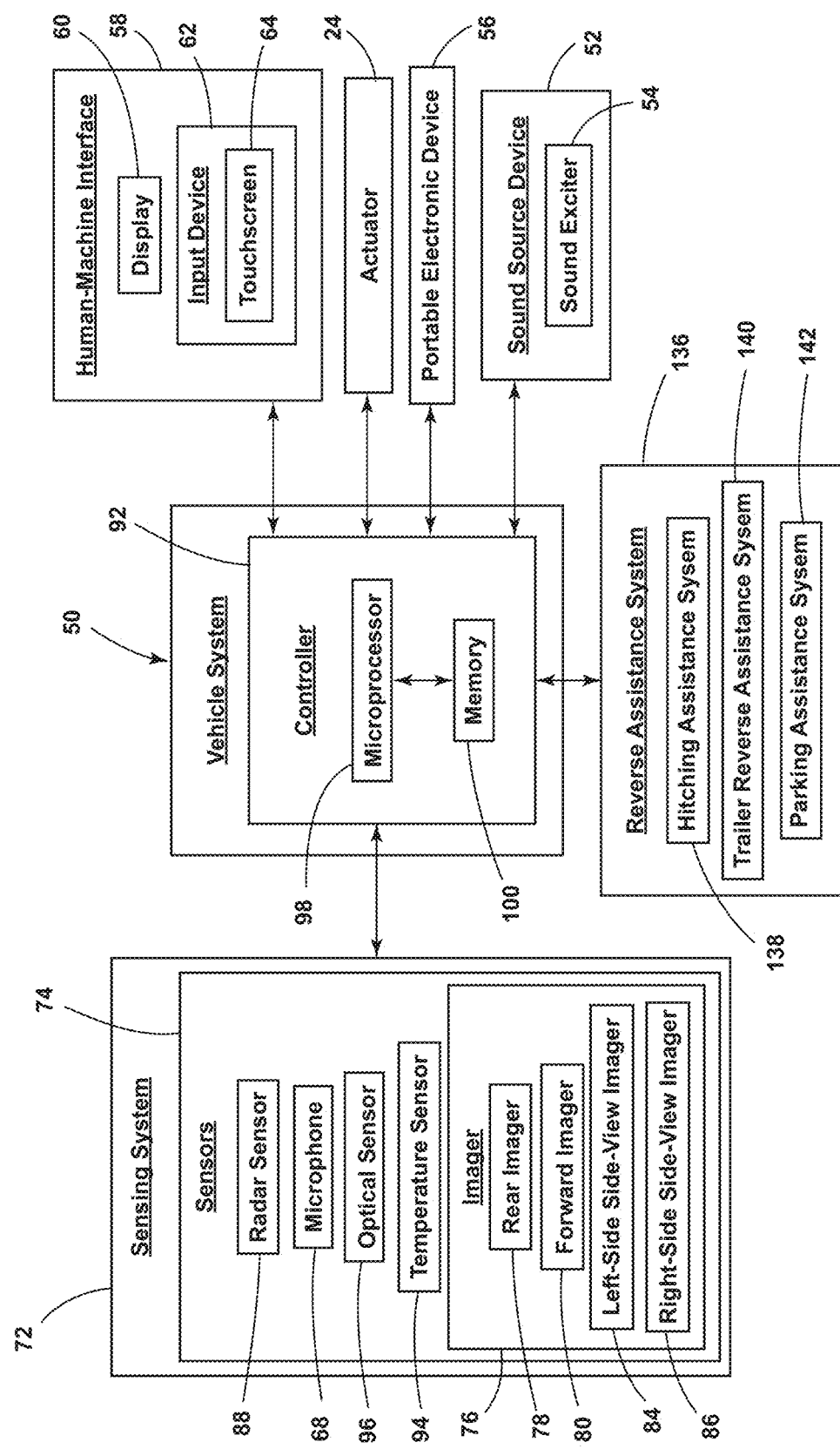
FIG. 2 is a block diagram of a system of the vehicle, according to one embodiment.

Referring now to FIG. 2, a system 50 for the vehicle 10 is disclosed. The system 50 may include a sound source device 52. The sound source device 52 may include one or more of a variety of devices configured to emit sound (e.g., a speaker). In some embodiments, the sound source device 52 may be a sound exciter 54. The sound exciter 54 may include a sound exciter coil and a generally rigid panel. The sound exciter coil may be coupled to the panel, such that during operation of the sound exciter 54, the sound exciter coil imparts vibration to the panel to produce sound. The sound source device 52 may be coupled to the vehicle 10. In some embodiments, the sound source device 52 is coupled to at least one closure panel 14 of the vehicle 10. In some implementations, the sound source device 52 may be coupled to at least one closure panel 14 of the rear gate assembly 26 of the vehicle 10. For example, the sound source device 52 may be the sound exciter 54 coupled to the rear glass panel 30 that is coupled to the top gate panel 36 of the rear gate assembly 26, as illustrated in FIG. 1. In such embodiments, the sound exciter coil may impart vibration to the rear glass panel 30 to produce sound.

In some embodiments, the sound source device 52 may be coupled to and/or integrated with a portable electronic device 56 of the system 50. The portable electronic device 56 may be generally distinct from the vehicle 10. In some embodiments the portable electronic device 56 may be configured to be carried by a user U. For example, the portable electronic device 56 may be a smartphone, key fob, or other device (e.g., a smartwatch, a laptop, a tablet, etc.). In an exemplary embodiment, the system 50 includes the portable electronic device 56 in the form of the smartphone, which includes the sound source device 52 in the form of a speaker.

Figure 18:
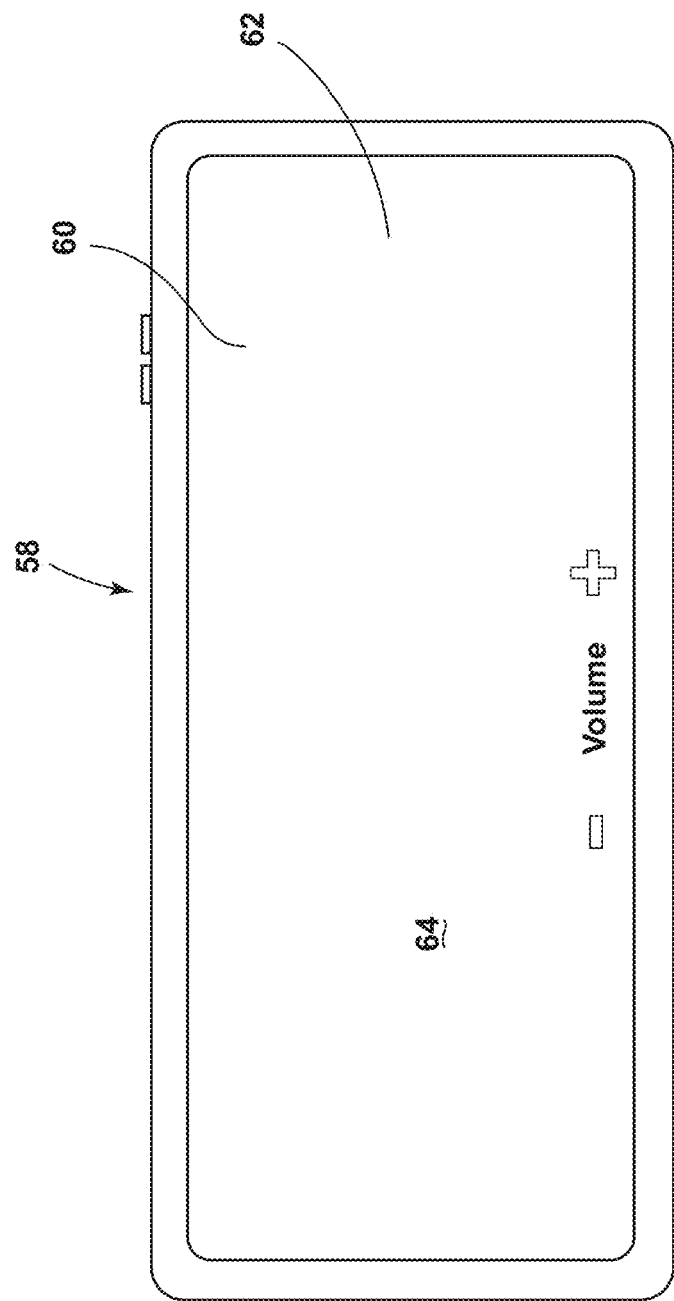
FIG. 18 is an elevational view of a human-machine interface of the vehicle, according to one embodiment.
Figure 19:
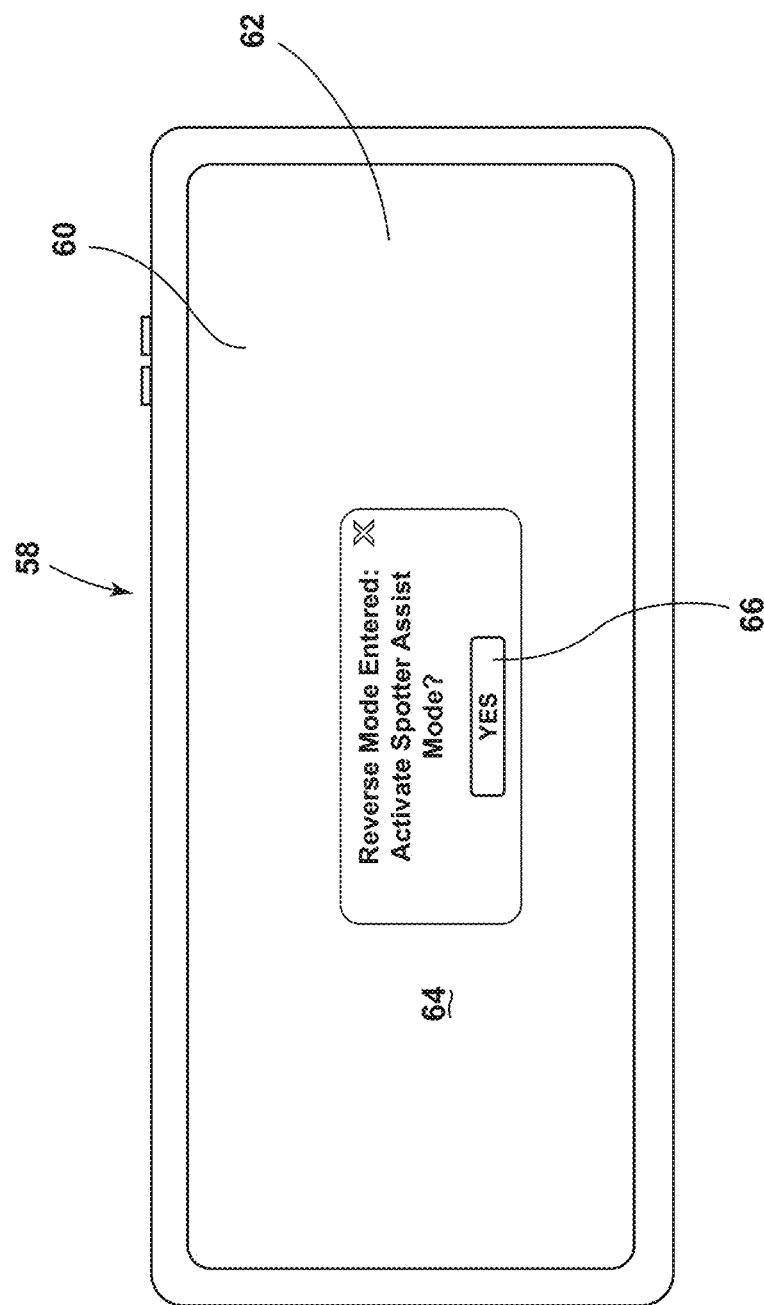
FIG. 19 is an elevational view of the human-machine interface, illustrating an input option displayed on the human-machine interface, according to one embodiment.

Referring now to FIGS. 2, 18, and 19, in various embodiments, the system 50 of the vehicle 10 may include a human-machine interface (HMI) 58. The HMI 58 may include a vehicle display 60, such as a center-stack mounted navigation or entertainment display 60. The HMI 58 may further include an input device 62, which may be implemented by configuring the display 60 as a portion of a touchscreen 64 with circuitry to receive user inputs entered via user selection of an input option 66 of the input device 62 that corresponds with a location over the display 60, wherein a visual representation of the input option 66 may be displayed. Other forms of input devices 62, such as one or more joysticks, digital input pads, buttons, dials, or the like, may be used in place of or in addition to touchscreen 64, in various implementations. In some embodiments, the system 50 may communicate via wireless communication with another embodiment of the HMI 58, such as with the portable electronic device 56. The portable electronic device 56 may also include the display 60 for displaying one or more images and other information to the user U. The portable electronic device 56 may be further able to receive user inputs via touchscreen 64 circuitry and/or other means. In addition, the portable electronic device 56 may provide feedback information, such as visual, audible, and tactile alerts.

Figure 4:
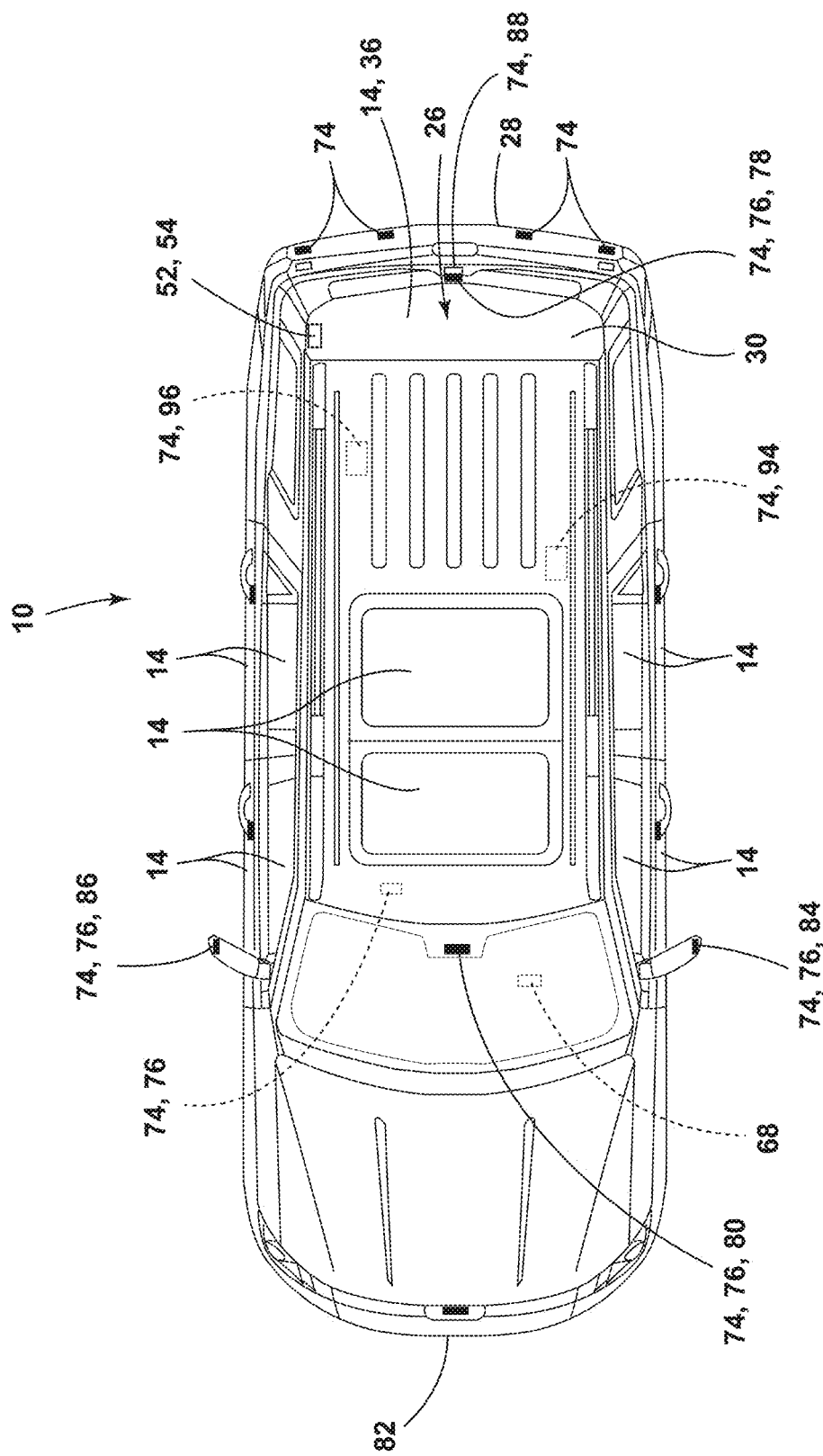
FIG. 4 is a plan view of the vehicle, illustrating a plurality of sensors of a sensing system of the vehicle, according to one embodiment.

Referring to FIGS. 2 and 4, the system 50 for the vehicle 10 may include a microphone 68 that detects sound. In various embodiments, the microphone 68 may be coupled to the vehicle 10. In some embodiments, the microphone 68 may be disposed within the cabin 12 of the vehicle 10. For example, the microphone 68 may be positioned within an overhead console of the vehicle 10 generally proximate to the driver of the vehicle 10. In some embodiments, the microphone 68 may be coupled to the closure panel 14 of the vehicle 10. For example, the microphone 68 may be coupled to at least one closure panel 14 of the rear gate assembly 26 of the vehicle 10. The microphone 68 may be coupled to an exterior 70 of the vehicle 10, such that the microphone 68 is configured to detect sound originating outside of the cabin 12 of the vehicle 10. In some embodiments, the microphone 68 may be coupled to the portable electronic device 56. For example, in some embodiments, the microphone 68 may be integrated into a smartphone that is incorporated into the system 50 for the vehicle 10.

Referring still to FIGS. 2 and 4, the system 50 for the vehicle 10 may include a sensing system 72. The sensing system 72 includes at least one sensor 74. In various embodiments, the sensing system 72 may include various sensors 74 and/or devices that obtain or otherwise provide information pertaining to a status of the vehicle 10 and/or various other entities (e.g., user U of the vehicle 10, living being L in proximity to the vehicle 10, a trailer 130 attached to the vehicle 10, etc.), as described further herein. For example, in some instances, the sensing system 72 may include one or more imagers 76 or any other vision-based device. In some implementations, the sensing system 72 may include one or more imagers 76 that are disposed within the cabin 12 of the vehicle 10 and configured to capture an image of the cabin 12 of the vehicle 10. In some implementations, the sensing system 72 may include one or more imagers 76 that are configured to capture an image of the exterior environment 16 of the vehicle 10. For example, the sensing system 72 may include one or more of a center high-mount stop light (CHMSL) imager, a rear imager 78 coupled to or above at least one closure panel 14 of the rear gate assembly 26, a forward imager 80 proximate to a forward end 82 of the vehicle 10, a left-side side-view imager 84, and/or a right-side side-view imager 86. The one or more imagers 76 may include an area-type image sensor, such as a CCD or a CMOS image sensor, and image-capturing optics that capture an image of an imaging field of view defined by the image-capturing optics.

In some instances, various imagers 76 included in the sensing system 72 may be positioned to generally overlap in their respective fields of view. In this manner, image data from two or more of the imagers 76 may be combined into a single image or image patch, via an image processing routine. In such examples, the image data may be used to derive stereoscopic image data that can be used to reconstruct a three-dimensional scene of the area or areas within overlapped areas of the various fields of view including any objects (e.g., trailer 130, living being L, etc.) therein.

In some examples, the use of two images including the same object can be used to determine a location of the object relative to the two imagers 76, given a known spatial relationship between the imagers 76, through projective geometry of the imagers 76. In this respect, known programming and/or functionality may be utilized in an image processing routine to identify an object within the image data from the various imagers 76 within the sensing system 72. The image processing routine may include information related to the positioning of any of the imagers 76 present on the vehicle 10, including relative to a center of the vehicle 10.

Referring still to FIGS. 2 and 4, the sensing system 72 may include at least one of a host of types of sensors 74 operable to sense a proximity and/or position of one or more objects within the cabin 12 and/or in the exterior environment 16 of the vehicle 10. For example, in various embodiments, the sensing system 72 may include, but is not limited to, one or more of an ultrasonic sensor, a radio detection and ranging (radar) sensor, a sound navigation and ranging (SONAR) sensor, a light detection and ranging (LIDAR) sensor, a vision-based sensor, and/or any other type of sensor known in the art.

In various embodiments, the sensing system 72 includes at least one radar sensor 88. In some embodiments, the at least radar sensor 88 may include a plurality of radar sensors 88 that cooperate to provide imaging radar. For example, four radar sensors 88 (e.g., Texas Instruments AWR6843 Single Chip 60-GHz to 64-GHz automotive radar sensor) may be incorporated into a single printed circuit board, and the data collected by the four radar sensors 88 may be utilized to produce imaging radar. The at least one radar sensor 88 may emit a radar beam 90. The radar beam 90 may have different beam widths at different distances from the radar sensor 88. For example, the radar beam 90 may have a beam width of 180 degrees within three meters of the at least one radar sensor 88, and the radar beam 90 may have a beam width of 120 degrees at 100 meters from the at least one radar sensor 88. In some implementations, the beam width of the radar beam 90 may be adjusted via a controller 92, as described further herein. For example, the controller 92 may be operable to adjust the beam width of the radar beam 90 from 180 degrees within three meters of the at least one radar sensor 88 to 60 degrees within three meters of the at least one radar sensor 88, in some implementations.

In various embodiments, the sensing system 72 may include one or more temperature sensors 94. The one or more temperature sensors 94 may be operable to detect a temperature within the cabin 12 of the vehicle 10 and/or a temperature in the exterior environment 16 of the vehicle 10. For example, the sensing system 72 may include a temperature sensor 94 that is operable to detect an ambient air temperature within the cabin 12 of the vehicle 10.

In some embodiments, the sensing system 72 may be operable to sense sunlight. It is contemplated that one or more of a variety of types of sensors 74 of the sensing system 72 may be utilized to sense sunlight. For example, in some embodiments, the sensing system 72 may include an optical sensor 96 configured to sense sunlight by converting optical energy introduced to the optical sensor 96 into an electric signal. The optical sensor 96 may absorb optical energy and sense sunlight using photoelectric effects that refer to discharge of electrons caused by absorption of optical energy. The optical sensor 96 may transmit the converted electric signal to the controller 92 of the sensing system 72, which may calculate the quantity of light based on the electric signal converted from the sensed sunlight. In some implementations, the sensing system 72 may be operable to sense how much light is entering the cabin 12 and/or a portion of the cabin 12. It is contemplated that, in various embodiments, the controller 92 may make a determination as to how much and/or at what locations sunlight is entering the vehicle 10 based on the sensing system 72 sensing one or more effects associated with sunlight. For example, the controller 92 may determine that sunlight is entering a portion of the cabin 12 based on image data received from at least one imager 76 of the vehicle 10 that reveals an illuminated portion of the vehicle 10 adjacent to a shaded portion of the vehicle 10. Various methods of sensing sunlight and/or determining the presence of sunlight are contemplated.

Referring now to FIG. 2, the system 50 may include and/or be in communication with the controller 92. The controller 92 may be configured with a microprocessor 98 to process logic and routines stored in memory 100 that receives information from the above-described devices and systems, including the sensing system 72, the sound source device 52, the portable electronic device 56, the microphone 68, the HMI 58, the one or more actuators 24, and/or various other vehicle sensors and devices. The controller 92 may generate commands to control operation of various components of the vehicle 10 and/or devices incorporated in the system 50 of the vehicle 10 as a function of all or a portion of the information received. The controller 92 may include the microprocessor 98 and/or other analog and/or digital circuitry for processing one or more routines. Further, the controller 92 may include the memory 100 for storing one or more routines.

It should be appreciated that the controller 92 may be a stand-alone dedicated controller 92 or may be a shared controller 92 integrated with other control functions, such as integrated with the sensing system 72, the portable electronic device 56, and/or other conceivable onboard or off-board vehicle control systems. It should further be appreciated that certain functions may be carried out by a dedicated processor. For example, image processing may be carried out by a dedicated processor, and the results of the image processing may be output to other components and systems of vehicle 10, including the microprocessor 98.

Figure 5:
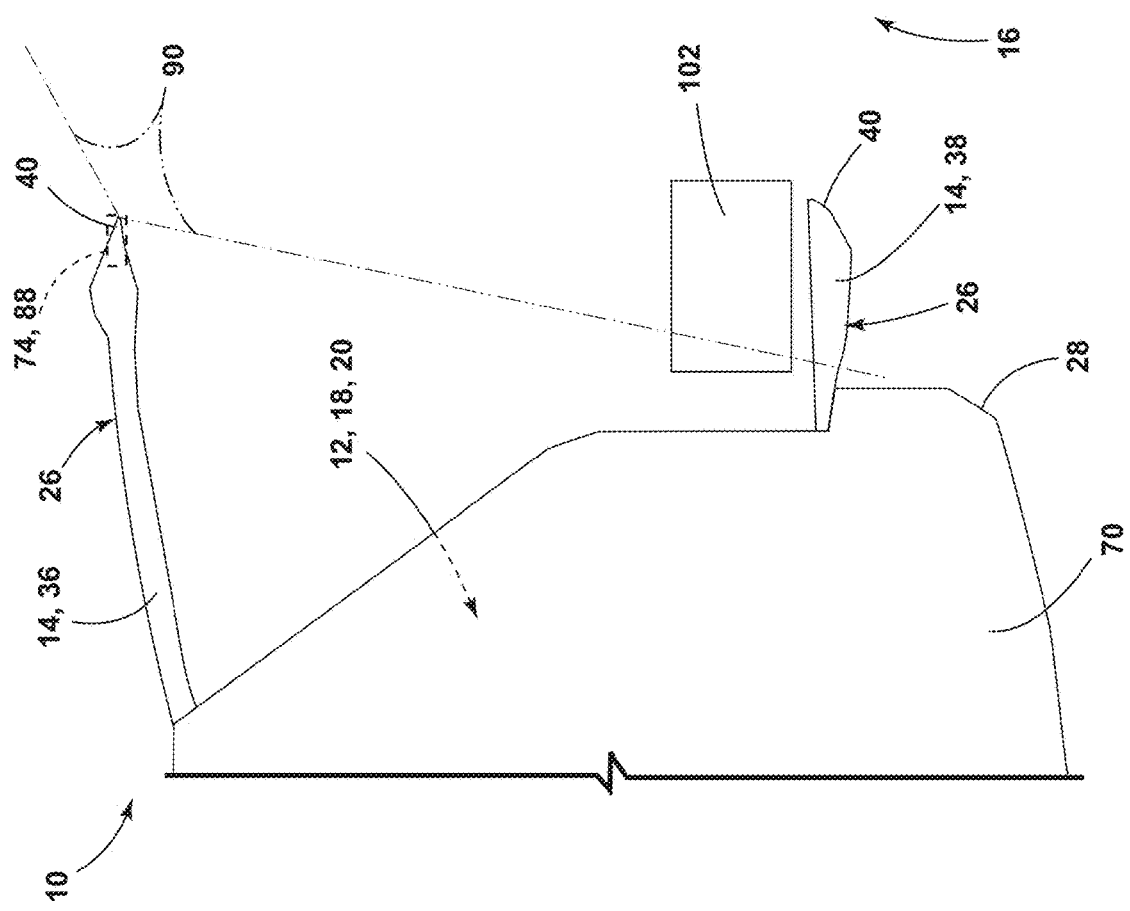
FIG. 5 is an elevational view of a portion of the vehicle, illustrating at least one radar sensor coupled to the top gate panel and an obstruction in a pivot path of the bottom gate panel of the rear gate assembly, according to one embodiment.

Referring now to FIGS. 1, 5, and 6, in some embodiments, wherein the vehicle 10 includes first and second closure panels 14 that are operable between open and closed positions, at least one sensor 74 may be coupled to the first closure panel 14 and configured to detect an obstruction 102 in a pivot path of the second closure panel 14. In other words, the at least one sensor 74 may be coupled to the first closure panel 14 and configured to detect an obstruction 102 in the path that the second closure panel 14 pivots between the open and closed positions. It is contemplated that, in various implementations, the at least one sensor 74 coupled to the first closure panel 14 may be operable to detect the obstruction 102 in the pivot path of the first closure panel 14 as well as detect the obstruction 102 in the pivot path of the second closure panel 14. In some implementations, wherein the at least one sensor 74 coupled to the first closure panel 14 is operable to detect the obstruction 102 in the pivot path of the second closure panel 14, the first closure panel 14 is operable to pivot about the first pivot axis 32 a first direction from the closed position to the open position, and the second closure panel 14 is operable to pivot about the second pivot axis 34 a second direction that is opposite the first direction from the closed position to the open position. Further, in some embodiments, the first closure panel 14 includes the distal end 40, which is located distally from the first pivot axis 32, and the at least one sensor 74 is coupled to the first closure panel 14 proximate to the distal end 40.

In the embodiment illustrated in FIGS. 1 and 5, the vehicle 10 includes the rear gate assembly 26. In the illustrated embodiments, the rear gate assembly 26 includes the first closure panel 14 in the form of the top gate panel 36, and the second closure panel 14 in the form of the bottom gate panel 38. The top gate panel 36 is operable to pivot vehicle-upward about the first pivot axis 32 from the closed position to the open position, and the bottom gate panel 38 is operable to pivot vehicle-downward about the second pivot axis 34 from the closed position to the open position. As illustrated in FIGS. 1 and 5, the at least one sensor 74 is coupled to the top gate panel 36 proximate to the distal end 40 of the top gate panel 36. The at least one sensor 74 coupled to the top gate panel 36 is configured to detect the obstruction 102 in the pivot path of the bottom gate panel 38, as illustrated in FIG. 5.

Figure 10:
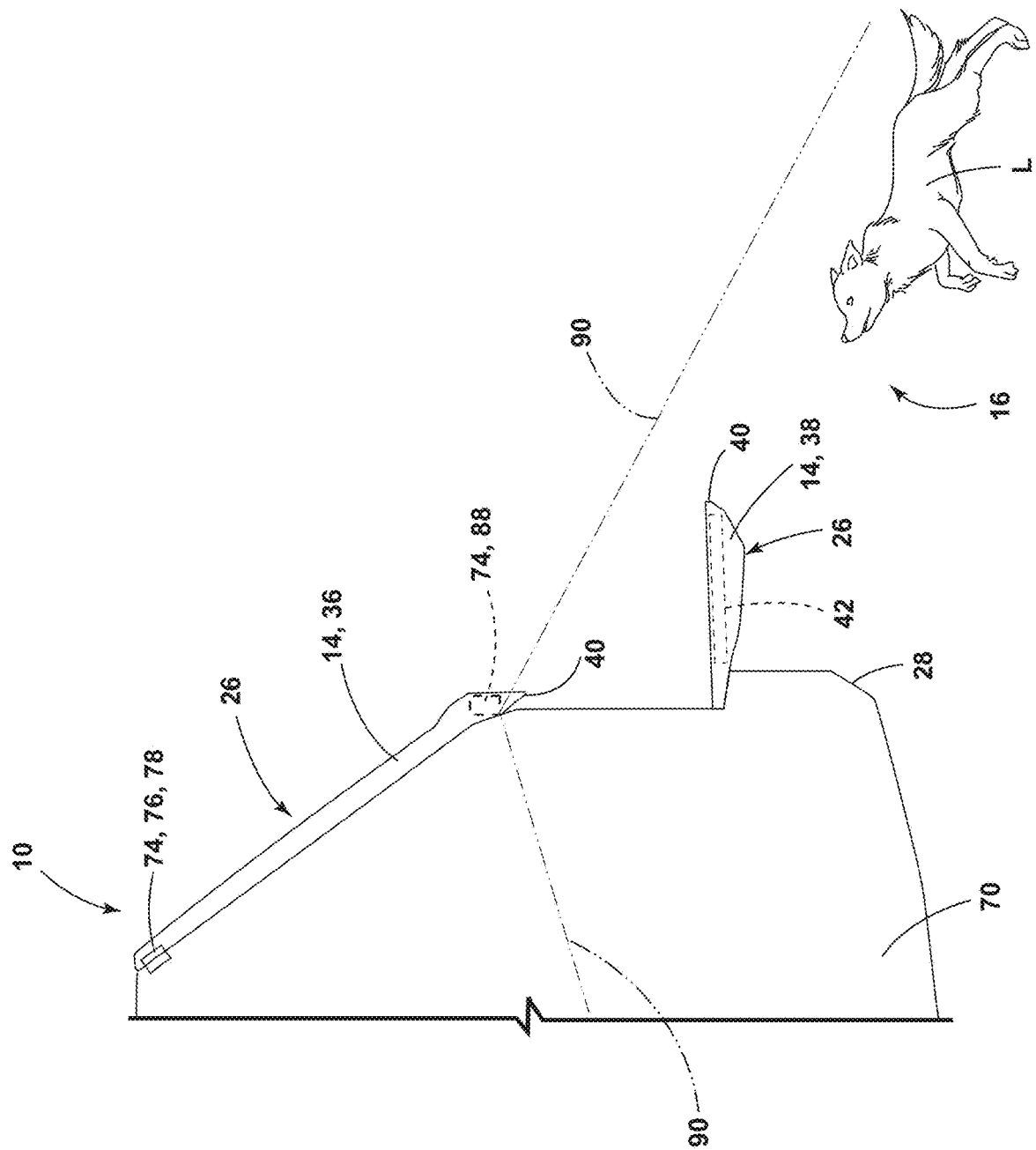
FIG. 10 is an elevational view of a portion of the vehicle, illustrating at least one sensor coupled to the closed top gate panel, the support feature coupled to the open bottom gate panel in a retracted position, and a living being in an exterior environment of the vehicle, according to one embodiment.
Figure 17:
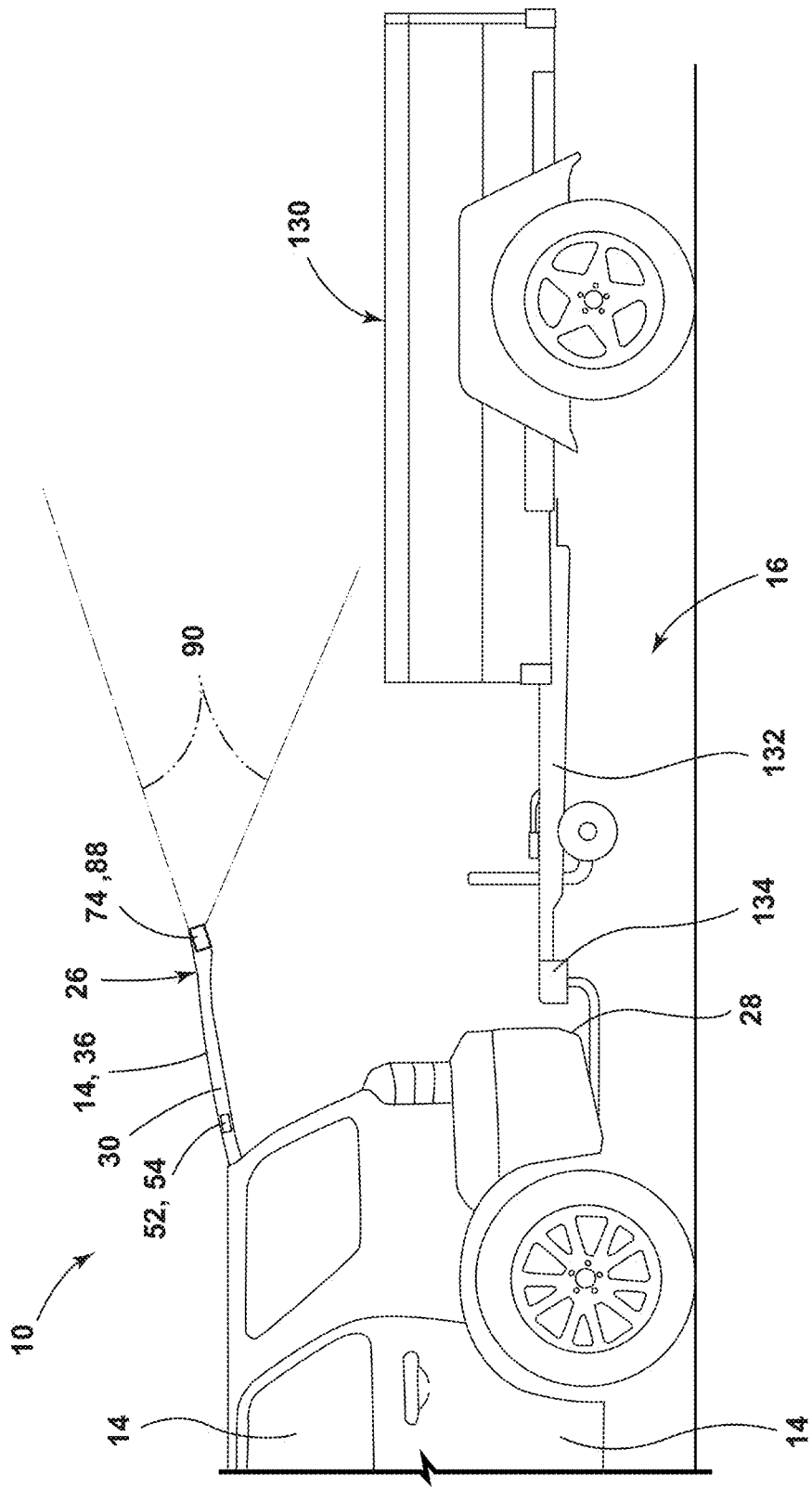
FIG. 17 is an elevational view of a portion of the vehicle and the trailer attached to the vehicle, illustrating the top gate panel of the rear gate assembly in the open position, according to one embodiment.

It is contemplated that the at least one sensor 74 coupled to the first closure panel 14 may include one or more of a variety of types of sensors 74 operable to detect the obstruction 102 in the pivot path of the second closure panel 14. For example, the at least one sensor 74 may include one or more of the sensor types of the sensing described herein (e.g., LIDAR, imager 76, SONAR, etc.). In some embodiments, the at least one sensor 74 may include at least one radar sensor 88. As described herein, the at least one radar sensor 88 may emit the radar beam 90. In some embodiments, the radar beam 90 emitted by the at least one radar sensor 88 coupled to the first closure panel 14 may be emitted into the cabin 12 of the vehicle 10 and the exterior environment 16 of the vehicle 10 in the closed position of the first closure panel 14. For example, as illustrated in FIG. 10, the at least one radar sensor 88 is coupled to the distal end 40 of the top gate panel 36 and is configured to emit the radar beam 90 into the cabin 12 and exterior environment 16 of the vehicle 10 in the closed position with the bottom gate panel 38 in the open position. Further, as illustrated in FIG. 6, the at least one radar sensor 88 coupled to the top gate panel 36 is configured to emit the radar beam 90 into the cabin 12 and exterior environment 16 of the vehicle 10 in the closed position of the top gate panel 36 and the bottom gate panel 38. In some implementations, radar beam 90 is emitted wholly into the exterior environment 16 of the vehicle 10 in the open position of the first closure panel 14. For example, as illustrated in FIG. 17, the radar beam 90 of the at least one radar sensor 88 coupled to the open top gate panel 36 is emitted generally vehicle-rearward, such that the radar beam 90 does not intersect with the cabin 12 of the vehicle 10.

In various embodiments, the controller 92 receives data from the at least one sensor 74 coupled to the first closure panel 14 and prompts a vehicle action based on the received data. In some embodiments, the controller 92 may control operation of the first closure panel 14 and/or the second closure panel 14 based on the data received from the at least one sensor 74. For example, the at least one sensor 74 coupled to the first closure panel 14 may detect an obstruction 102 in the pivot path of second closure panel 14 as the second closure panel 14 is being power actuated by one or more actuators 24 from the open position to the closed position. In response to receiving the data from the at least one sensor 74 indicating the detection of the obstruction 102, the controller 92 may control operation of the second closure panel 14 by prompting the actuator 24 to halt movement of the second closure panel 14. It is contemplated that the controller 92 may control operation of one or more closure panels 14 by prompting a variety of actions (e.g., locking, unlocking, moving toward the open position, moving toward the closed position, halting movement, etc.).

In the exemplary embodiment illustrated in FIG. 5, the vehicle 10 includes the rear gate assembly 26, which includes the top gate panel 36 and the bottom gate panel 38. At least one radar sensor 88 is coupled to the top gate panel 36 and emits the radar beam 90 that intersects the pivot path of the bottom gate panel 38 with the top gate panel 36 in the open position. In operation, the user U may attempt to close the bottom gate panel 38 remotely via entry of an input into the portable electronic device 56 (e.g., key fob). The controller 92 then controls operation of the bottom gate panel 38 by not moving the bottom gate panel 38 to the closed position as requested based on data received from the at least one radar sensor 88 indicating detection of the obstruction 102 in the pivot path of the bottom gate panel 38, as illustrated in FIG. 5. In various implementations, the controller 92 may prompt additional vehicle actions to alert the user U that the request to close the bottom gate panel 38 was denied. For example, the controller 92 may prompt the sound source device 52 to emit an audible alert if a requested action is not executed.

Referring now to FIG. 6, in some embodiments, the at least one sensor 74 coupled to the first closure panel 14 and operable to detect the obstruction 102 in the pivot path of the second closure panel 14 may be further operable to detect the obstruction 102 in the travel path of the vehicle 10. In some implementations, the at least one sensor 74 may be operable to detect the obstruction 102 in the travel path of the vehicle 10 with the first and second closure panels 14 in the closed positions. In various embodiments, the at least one sensor 74 may detect an obstruction 102 in the pivot path of the first and/or second closure panels 14 in a first vehicle state, and the at least one sensor 74 may be operable to detect the obstruction 102 in the travel path of the vehicle 10 in a second vehicle state. Further, the controller 92 may interpret and/or respond to data received from the at least one sensor 74 differently in the first vehicle state than the second vehicle state. The presence and/or absence of a variety of vehicle conditions may determine whether the vehicle 10 is in the first vehicle state or the second vehicle state (e.g., position of closure panels 14, whether the vehicle 10 is turned on, whether the vehicle 10 is in gear, whether a command to open the closure panel 14 has been entered, speed of the vehicle 10, etc.). In an exemplary embodiment, the first vehicle state may occur if the vehicle 10 is in a reverse gear, and the second vehicle state may occur if the vehicle 10 is not in reverse and a closure panel 14 operation request (e.g., open the closure panel 14, close the closure panel 14, etc.) is received.

In various embodiments, the controller 92 may prompt a vehicle action based on the at least one sensor 74 detecting the obstruction 102 in the travel path of the vehicle 10. For example, the controller 92 may prompt the HMI 58 to display a visual alert, the sound source device 52 to emit an audible alert, and/or a vehicle brake system to apply a brake in response to the at least one sensor 74 detecting the obstruction 102 in the travel path of the vehicle 10. Various vehicle actions are contemplated.

In an exemplary embodiment, the vehicle 10 includes the rear gate assembly 26, which is comprised of the top gate panel 36 and the bottom gate panel 38. At least one radar sensor 88 is coupled to the top gate panel 36 and emits the radar beam 90. In operation, the user U of the vehicle 10 reverses the vehicle 10 with both the top gate panel 36 and the bottom gate panel 38 in the closed positions, as illustrated in FIG. 6. While the vehicle 10 is reversing, a portion of the radar beam 90 of the at least one radar sensor 88 is emitted vehicle-rearward into the exterior environment 16 rearward of the vehicle 10. As the vehicle 10 approaches an object in the travel path of the vehicle 10, the at least one radar sensor 88 senses the obstruction 102 and transmits data to the controller 92. The controller 92 receives the data indicating the presence of the obstruction 102 in the travel path of the vehicle 10 and prompts the sound source device 52 to emit an audible warning. Hearing the audible warning, the driver stops the vehicle 10 short of the obstruction 102, parks, and turns the vehicle 10 off. When the driver later attempts to remotely open the rear gate assembly 26, the at least one radar sensor 88 coupled to the top gate panel 36 senses whether any obstructions 102 are present in the pivot path of the top gate panel 36 and the bottom gate panel 38 and transmits data to the controller 92. The controller 92 prompts the top and bottom gate panels 36, 38 to open based on the data received from the at least one radar sensor 88 indicating that no obstructions 102 are present.

Figure 8:
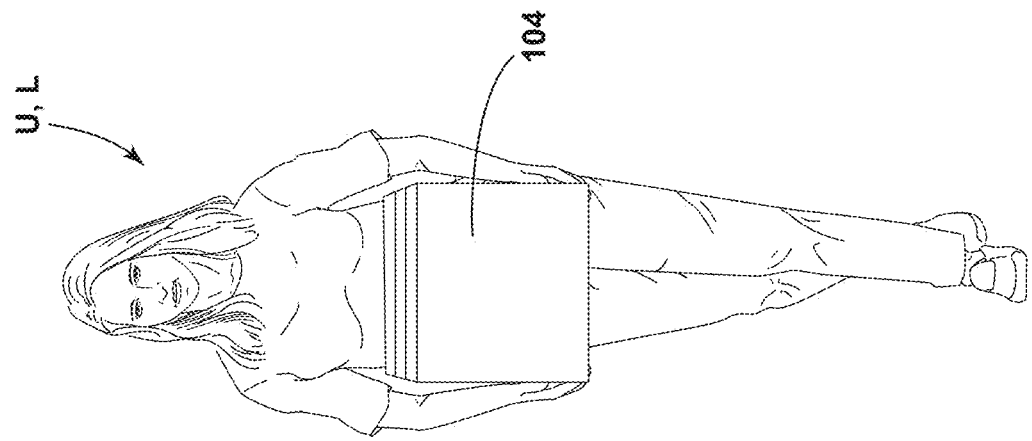
FIG. 8 is a perspective view of the user, illustrating the user carrying an object with both hands, according to one embodiment.
Figure 7:
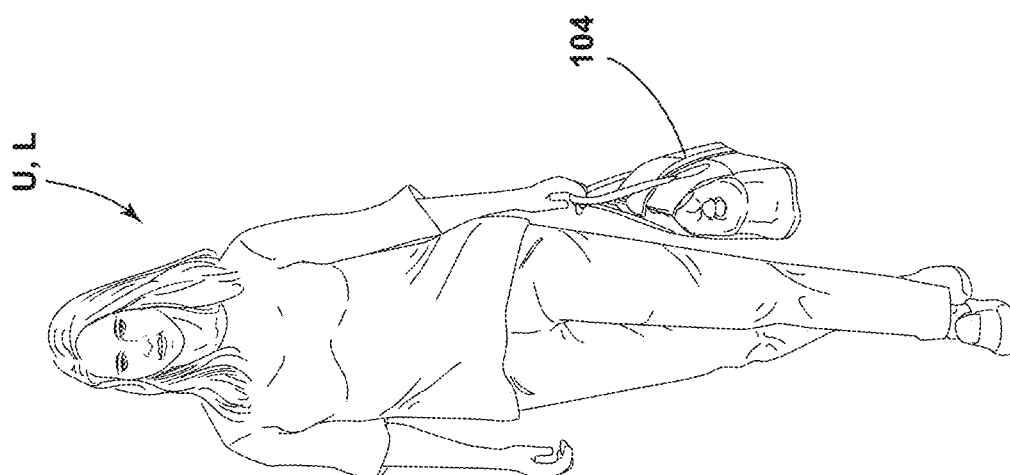
FIG. 7 is a perspective view of a user carrying an object with one hand and having another hand free, according to one embodiment.

Referring now to FIGS. 7 and 8, in some embodiments, the sensing system 72 may sense at least one characteristic of the user U positioned in the exterior environment 16 of the vehicle 10, and the controller 92 may determine a load carrying condition of the user U based on the at least one characteristic of the user U sensed by the sensing system 72. The controller 92 may be operable to prompt various vehicle actions based on the determined load carrying condition. In various embodiments, the controller 92 is configured to control operation of at least one closure panel 14 of the vehicle 10 based on the determined load carrying condition. For example, the controller 92 may prompt actuation of a first closure panel 14 from the closed position to the open position based on a determination of a first load carrying condition of the user U, and the controller 92 may prompt actuation of the first closure panel 14 and a second closure panel 14 from the closed positions to the open positions, respectively, based on a determination of a second load carrying condition of the user U.

The sensing system 72 may be configured to sense a variety of characteristics of the user U in the exterior environment 16 of the vehicle 10. In some embodiments, the sensing system 72 may sense at least one characteristic of at least one hand of the user U. For example, the sensing system 72 may sense the position of one or both of the hands of the user U (e.g., at the user's side, in front of the user U, etc.) as the user U approaches the vehicle 10, movement of one or both of the user's hands as the user U walks, and/or the shape of the user's hands (e.g., open, closed, etc.). Further, the sensing system 72 may sense at least one characteristic of a gait of the user U. For example, the sensing system 72 may sense the speed that the user U is walking, the position of various portions of the user U (e.g., head, shoulders, etc.), and/or the posture of the user U approaching the vehicle 10 (e.g., whether the user U is standing up straight or hunched over). In some implementations, the sensing system 72 may sense at least one characteristic of an object 104 held by the user U. For example, the sensing system 72 may sense the shape, size, and/or position of the object 104 held by the user U. It is contemplated that the sensing system 72 may sense a plurality of characteristics (e.g., object 104, gait, hands, etc.) simultaneously, in some embodiments. Further, a variety of other characteristics may be sensed by the sensing system 72, in some embodiments.

It is contemplated that various types of sensors 74 and devices of the sensing system 72 may be utilized to sense the at least one characteristic of the user U in the exterior environment 16 of the vehicle 10. For example, one or more LIDAR sensors, imagers 76, SONAR sensors, and/or radar sensors 88 of the sensing system 72 may be utilized to sense the at least one characteristic of the user U. In some embodiments, the sensing system 72 may utilize at least one radar sensor 88 to sense the at least one characteristic of the user U. For example, a plurality of radar sensors 88 that in cooperation produce imaging radar, as described herein, may be utilized in some embodiments. In some implementations, one or more imagers 76 of the sensing system 72 may be utilized to sense the at least one characteristic of the user U. For example, the rear imager 78 may capture image data of the at least one characteristic of the user U. It is contemplated that a plurality of types of sensors 74 of the sensing system 72 may be utilized to sense the at least one characteristic of the user U cooperatively via sensor fusion, in various implementations.

Referring now to FIGS. 7 and 8, the controller 92 may determine the load carrying condition of the user U based on the characteristics of the user U sensed by the sensing system 72. In some embodiments, the controller 92 may determine a first load carrying condition of the user U based on the data gathered by the sensing system 72 while the sensing system 72 is sensing the user U with at least one free hand. For example, the controller 92 may determine the first load carrying condition of the user U based on the sensed swinging movement of the hand as the user U walks and/or the sensed shape of the open-palmed hand that occurs when the user U approaches the vehicle 10 with at least one hand free. The controller 92 may determine a second load carrying condition of the user U based on the data gathered by the sensing system 72 while the sensing system 72 is sensing the user U with both hands full. For example, the controller 92 may determine the second load carrying condition of the user U based on the sensed positions of the hands in front of the user U and/or the sensed shape of the closed fists of the user U that occurs when the both hands of the user U are full.

In some embodiments, the controller 92 may determine the load carrying condition of the user U based on the data gathered by the sensing system 72 while the sensing system 72 is sensing the gait of the user U. For example, the controller 92 may determine a first load carrying condition based on data from the sensing system 72 indicating the user's gait conforms to a natural gait of the user U, wherein the user U is unencumbered or not carrying a load. Further, the controller 92 may determine a second load carrying condition based on data from the sensing system 72 that indicates the gait of the user U is not natural and/or conforms with a load carrying gait. For example, the sensing system 72 may sense the user U walking slowly with slumped shoulders, and the controller 92 may determine a second load carrying condition of the user U as a result.

In some embodiments, the controller 92 determines the load carrying condition of the user U based on at least one sensed characteristic of the object 104 held by the user U. For example, the controller 92 may determine a first load carrying condition based on the object 104 held by the user U being smaller than a predetermined size threshold. The controller 92 may determine a second load carrying condition based on the object 104 carried by the user U being above the predetermined size threshold. In an exemplary embodiment, the controller 92 may determine a first load carrying condition of the user U based on the sensing system 72 sensing the user U holding an object 104 of a first size, and the controller 92 may determine a second load carrying condition of the user U based on the sensing system 72 sensing the user U holding an object 104 of a second size, wherein the second size is greater than the first size. It is contemplated that, in various embodiments, the controller 92 may determine the load carrying condition of the user U based on a plurality of sensed characteristics of the user U. For example, the controller 92 may determine the load carrying condition of the user U based on the sensed characteristics of the user's hands, gait, and/or the object 104 held by the user U. A variety of other user U characteristics are contemplated.

In various embodiments, the controller 92 may be operable to prompt various vehicle actions based on the determined load carrying condition of the user U. In an exemplary embodiment, the vehicle 10 includes the rear gate assembly 26, which includes the top gate panel 36 and the bottom gate panel 38, as illustrated in FIG. 1. In operation, the user U approaches the rear gate assembly 26 by walking with a natural gait while carrying a handbag with one hand and no items in the other hand, as illustrated in FIG. 7. The sensing system 72 senses the user U approaching in this manner and transmits data indicative of one or more of these characteristics of the user U to the controller 92. The controller 92 determines, based on data received from the sensing system 72, a first load carrying condition of the user U. In response to the determination of the first load carrying condition of the user U the controller 92 prompts movement of the top gate panel 36 from the closed position to the open position. The bottom gate panel 38 remains in the closed position. Later, the user U approaches the rear gate assembly 26 by walking with an encumbered gait, wherein the user's shoulders are hunched over, while carrying a box with both hands, as illustrated in FIG. 8. The sensing system 72 senses the user U approaching in this manner and transmits data indicative of one or more of these characteristics of the user U to the controller 92. The controller 92 determines, based on the received data, a second load carrying condition of the user U. In response to the determination of the second load carrying condition of the user U, the controller 92 prompts movement of the top and bottom gate panels 36, 38 from the closed positions to the open positions.

Figure 9:
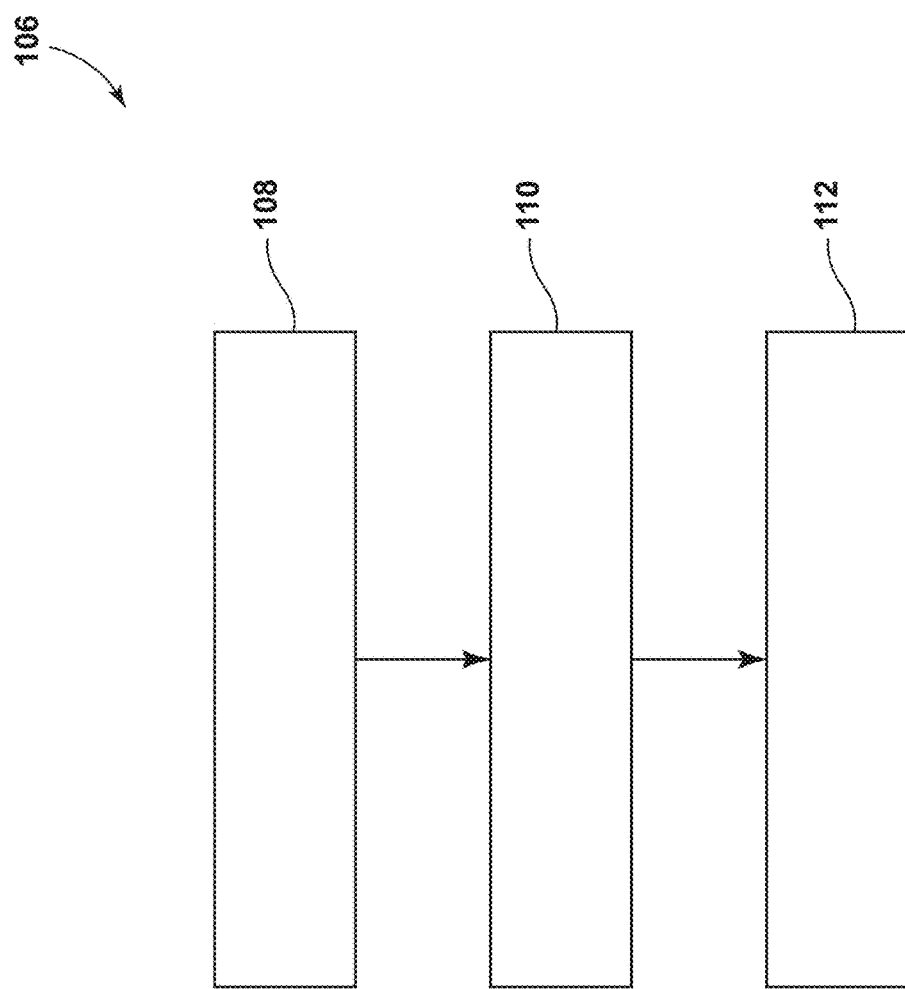
FIG. 9 is a block diagram illustrating a method for providing access to the vehicle, according to one embodiment.

Referring now to FIG. 9, a method 106 for providing access to the vehicle 10 is disclosed. The method 106 for providing access to the vehicle 10 includes the step 108 of sensing the user U positioned in the exterior environment 16 of the vehicle 10 with the sensing system 72. In some implementations, the step 108 of sensing the user U positioned in the exterior environment 16 of the vehicle 10 comprises sensing the user U approaching the vehicle 10. The step 108 may comprise sensing the user U approaching a rear portion of the vehicle 10, such as the rear gate assembly 26 of the vehicle 10.

The method 106 for providing access to the vehicle 10 may further include the step 110 of determining a load carrying condition of the user U with a controller 92 based on data from the sensing system 72. As described herein, in various embodiments, the controller 92 may determine the load carrying condition based on at least one sensed characteristic of the user U, such as one or more characteristics of the hands of the user U, the gait of the user U, and/or an object 104 carried by the user U. For example, if the user U has a free hand, as illustrated in FIG. 7, the controller 92 may determine a first load carrying condition. Conversely, if the hands of the user U are full, as illustrated in FIG. 8, the controller 92 may determine a second load carrying condition of the user U.

The method 106 of providing access to the vehicle 10 may further include the step 112 of opening at least one of a first closure panel 14 of the vehicle 10 and a second closure panel 14 of the vehicle 10 based on the determined load carrying condition of the user U. In various embodiments, the first closure panel 14 is opened if the first load carrying condition is determined by the controller 92, and the first and second closure panels 14 are opened if the second load carrying condition is determined by the controller 92. In some implementations, the first closure panel 14 forms at least a portion of the rear gate assembly 26 of the vehicle 10. For example, the first closure panel 14 may be an openable rear glass panel 30 coupled to a lift gate, in some embodiments. In another embodiment, the first closure panel 14 may be the top gate panel 36 of the rear gate assembly 26 that includes the top gate panel 36 and the bottom gate panel 38. In some embodiments, the first closure panel 14 is operable to pivot about the first pivot axis 32 a first direction from the closed position to the open position and the second closure panel 14 is operable to pivot about the second pivot axis 34 a second direction from the closed position to the open position, wherein the second direction is opposite the first direction. In some embodiments, the first and second closure panels 14 are top and bottom gate panels 36, 38 of the rear gate assembly 26 of the vehicle 10, respectively. The bottom gate panel 38 is positioned vehicle-downward of the top gate panel 36 and the first and second closure panels 14 are coupled to each other in the closed positions, as illustrated in FIG. 6.

Referring now to FIGS. 2 and 10-12B, in some embodiments, the sensing system 72 may detect a living being L. The living being L may be the user U, as described herein, or an animal. In some implementations, the living being L may be a four-legged animal, such as a dog or a cat. At least one of a variety of types of sensors 74 included in the sensing system 72 may be utilized to sense the living being L. For example, one or more LIDAR sensors, imagers 76, SONAR sensors, and/or radar sensors 88 of the sensing system 72 may be utilized to sense the living being L, in some embodiments.

Referring still to FIGS. 2 and 10-12B, as described herein, the sensing system 72 transmits data to the controller 92. The controller 92 may authenticate the identity of the living being L and/or determine the position of the living being L based on the data received from the sensing system 72. In some embodiments, image data transmitted from at least one imager 76 of the sensing system 72 may be utilized by the controller 92 to authenticate the identity of the living being L. In some implementations, the controller 92 may process the image data and/or utilize otherwise processed image data to perform a facial recognition analysis of the living being L to authenticate the identity of the living being L. It is contemplated that various other biometric comparisons may be performed to authenticate the identity of the living being L, in various implementations. For example, the size, color, shape, and/or position of living being L and/or one or more portions thereof, as sensed by the sensing system 72, may be utilized to authenticate the identity of the living being L. It is contemplated that the data collected by the sensing system 72 may be compared against reference data stored within memory 100. For example, one or more reference images of the living being L may be stored in memory 100 and compared to image data of the living being L collected by the at least one imager 76 of the sensing system 72 to authenticate the identity of the living being L.

As described herein, the controller 92 may determine the position of the living being L based on the data received from the sensing system 72. In some embodiments, the controller 92 may determine the position of the living being L relative to the vehicle 10 and/or a portion of the vehicle 10. In some embodiments, the controller 92 determines the position of the living being L relative to the rear gate assembly 26 of the vehicle 10. As described herein, a variety of sensors 74 of the sensing system 72 may be utilized to sense the proximity and/or position of the living being L, in various embodiments. In an exemplary embodiment, the rear gate assembly 26 of the vehicle 10 includes top and bottom gate panels 36, 38, and at least one radar sensor 88 is coupled to the top gate panel 36. The controller 92 may determine the position of the living being L based on data received from the at least one radar sensor 88.

Referring still to FIGS. 2 and 10-12B, the controller 92 may control operation of the rear gate assembly 26 of the vehicle 10 based on the determined position of the living being L and/or the authenticated identity of the living being L. In such embodiments, the rear gate assembly 26 of the vehicle 10 may include at least one closure panel 14 that is operable to pivot vehicle-downward from the closed position to the open position. The closure panel 14 may selectively provide access to the cabin 12 of the vehicle 10 and/or the cargo area 18 of the vehicle 10, in various embodiments. For example, in some embodiments, the vehicle 10 is a truck and the at least one closure panel 14 is the tailgate of the truck that pivots vehicle-downward from the closed position to the open position to provide access to the cargo area 18 of the vehicle 10, which is the bed of the truck. In another exemplary embodiment, the rear gate assembly 26 of the vehicle 10 includes the top gate panel 36 and the bottom gate panel 38, as illustrated in FIG. 1. The bottom gate panel 38 is operable to pivot vehicle-downward from the closed position to the open position to provide access to the cabin 12 of the vehicle 10. Various types of rear gate assemblies 26 are contemplated.

Figure 11:
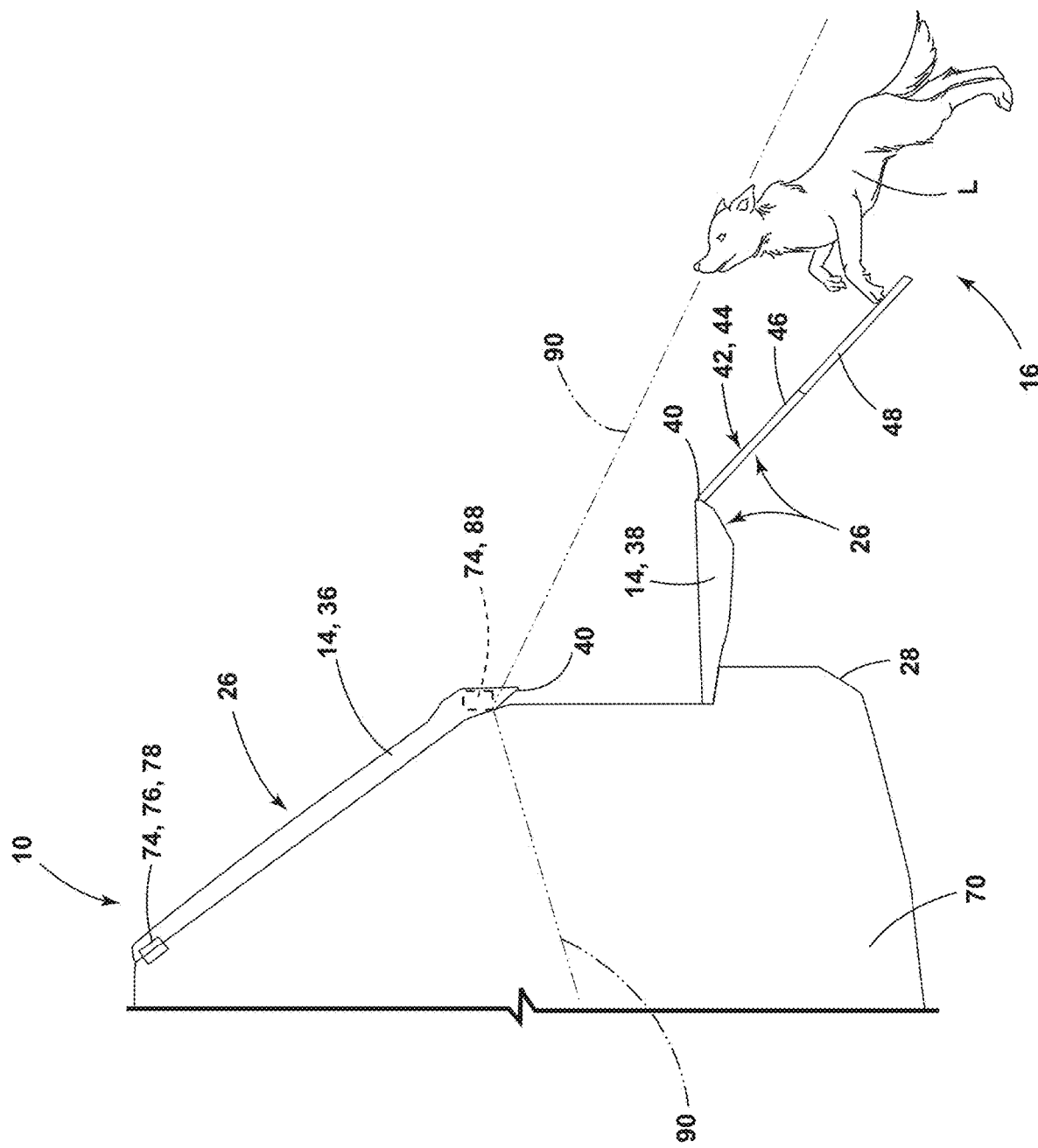
FIG. 11 is an elevational view of a portion of the vehicle, illustrating at least one sensor coupled to the closed top gate panel, the support feature coupled to the open bottom gate panel in the deployed position, and the living being on the support feature, according to one embodiment.

In various embodiments, wherein the controller 92 is configured to control operation of the rear gate assembly 26 based on the determined position of the living being L and/or the authenticated identity of the living being L, the rear gate assembly 26 of the vehicle 10 includes the support feature 42. As described herein, the support feature 42 may be coupled to the at least one closure panel 14 that is operable to pivot vehicle-downward from the closed position to the open position. The support feature 42 may move relative to the at least one closure panel 14 between the retracted position and the deployed position. As illustrated in FIGS. 10 and 11, in the open position of the at least one closure panel 14, the position of the support feature 42 in the deployed position is further vehicle-downward than the position of the support feature 42 in the retracted position. In the illustrated embodiment, the support feature 42 comprises the ramp 44 that extends out of the at least one closure panel 14 from the retracted position to the deployed position. As described herein, various types of support features 42 operable to move between the retracted and deployed positions are contemplated.

In various embodiments, the controller 92 may control operation of the rear gate assembly 26 by controlling movement of the closure panel 14 and/or the support feature 42 via one or more actuators 24 based on the determined position of the living being L and/or the authenticated identity of the living being L. In an exemplary embodiment, the controller 92 may receive data from the sensing system 72 and determine that the living being L is positioned within a predetermined distance from the at least one closure panel 14 of the rear gate assembly 26 of the vehicle 10. Further, the controller 92 may authenticate the identity of the living being L by determining that the identity of the living being L matches an identity profile stored in memory 100. In response, the controller 92 may move the at least one closure panel 14 from the closed position to the open position and move the support feature 42 from the retracted position to the deployed position via the one or more actuators 24. It is contemplated that, in some embodiments, one of the at least one closure panel 14 of the rear gate assembly 26 and the support feature 42 coupled with the closure panel 14 may be operated in response to the controller 92 authenticating the identity of the living being L and/or determining the position of the living being L. For example, in some embodiments, the at least one closure panel 14 may move from the closed position to the open position. In other embodiments, the at least one closure panel 14 may be in the open position, and the support feature 42 may move from the retracted position to the deployed position.

In various embodiments, the controller 92 may control operation of the rear gate assembly 26 based on the determined position of the living being L relative to a portion of the vehicle 10. In some embodiments, the controller 92 may control operation of the rear gate assembly 26 based on the position of the living being L relative to the rear gate assembly 26 of the vehicle 10. For example, the controller 92 may control operation of the rear gate assembly 26 based on the proximity of the living being L to the rear gate assembly 26. In some embodiments, the controller 92 may control operation of the rear gate assembly 26 based on the determined position of the living being L within the cabin 12 of the vehicle 10. For example, the imager 76 disposed within the cabin 12 of the vehicle 10 may collect image data of the living being L positioned inside of the cabin 12 of the vehicle 10 and transmit the image data to the controller 92. The controller 92 may determine that the living being L is positioned within a predetermined proximity to the rear gate assembly 26 of the vehicle 10 and prompt one or more actuators 24 to move the support feature 42 from the retracted position to the deployed position.

In some embodiments, the controller 92 may control operation of the rear gate assembly 26 of the vehicle 10 based on the position of the living being L in the exterior environment 16 of the vehicle 10. For example, at least one radar sensor 88 of the sensing system 72 of the vehicle 10 may detect the living being L in the exterior environment 16 of the vehicle 10 and transmit corresponding data to the controller 92. The controller 92 may determine that the living being L is within a predetermined proximity of the rear gate assembly 26 of the vehicle 10 based on the data received from the at least one radar sensor 88. In response, the controller 92 may prompt one or more actuators 24 to move the support feature 42 from the retracted position to the deployed position.

Figure 12B:
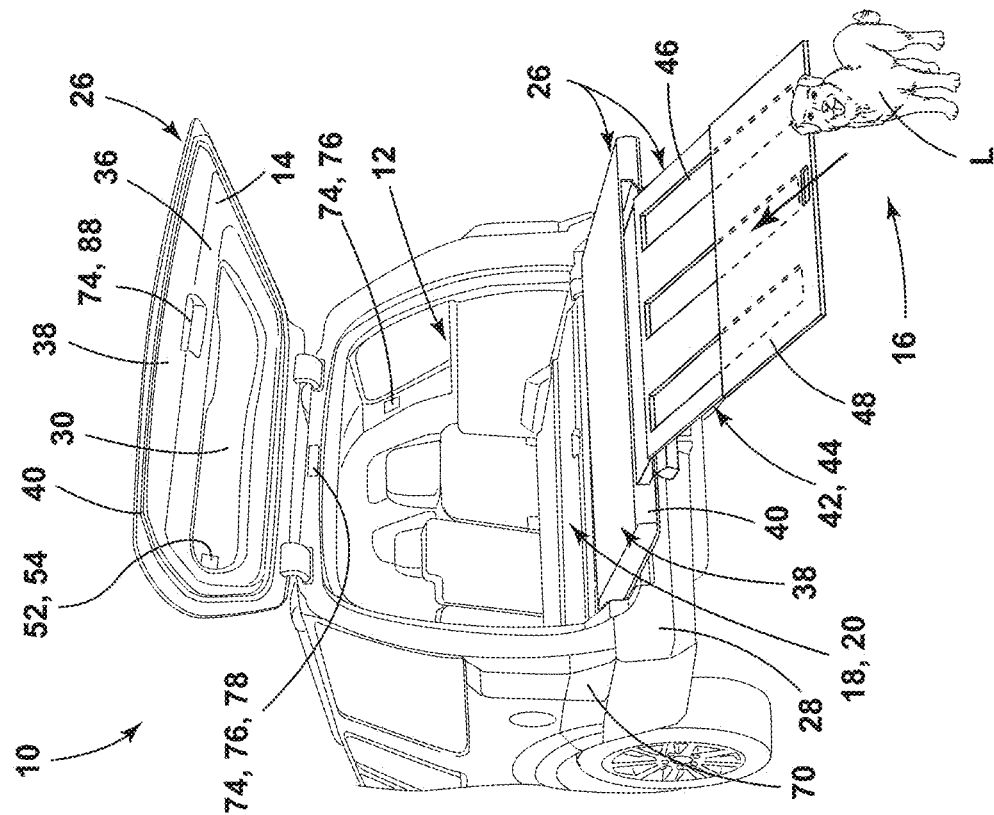
FIG. 12B is a rear perspective view of the vehicle, illustrating the living creature in the exterior environment of the vehicle and the support feature coupled to the open bottom gate panel of the rear gate assembly, according to one embodiment.
Figure 12A:
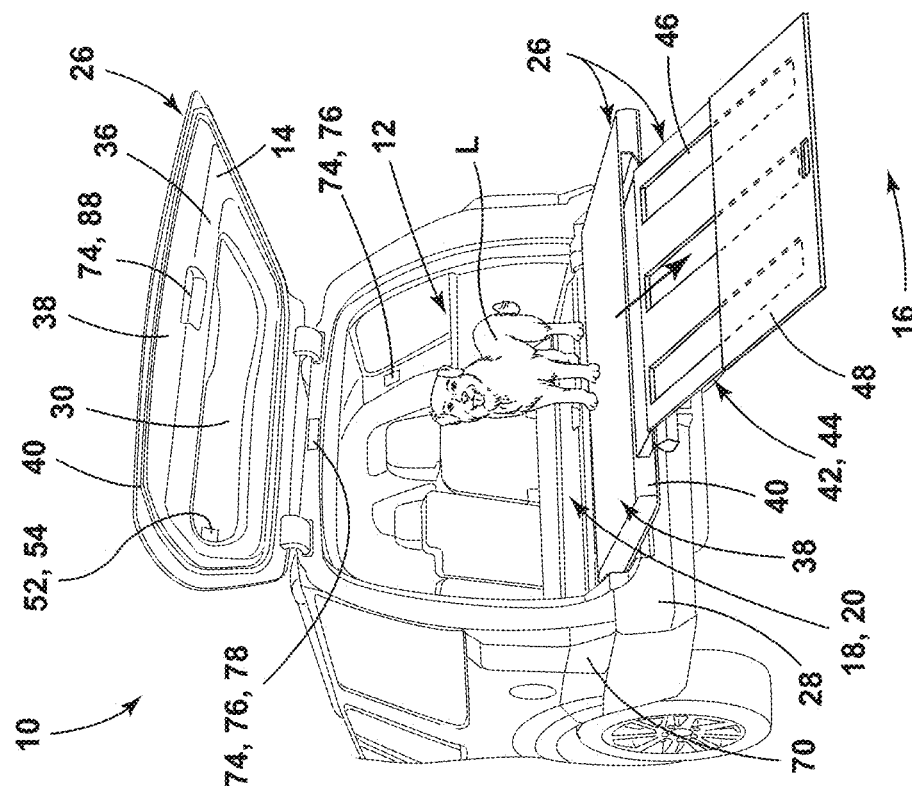
FIG. 12A is a rear perspective view of the vehicle, illustrating the living being within the cabin of the vehicle proximate to the open bottom gate panel and the support feature in the deployed position, according to one embodiment.

Referring now to FIGS. 10-12B, in an exemplary embodiment, the rear gate assembly 26 of the vehicle 10 includes the top gate panel 36 and the bottom gate panel 38. The support feature 42 is coupled to the bottom gate panel 38. At least one radar sensor 88 is coupled to the top gate panel 36. A first imager 76 is coupled to the exterior 70 of the vehicle 10, and a second imager 76 is positioned within the cabin 12 of the vehicle 10. The first imager 76 has a field of view generally vehicle-rearward of the rear gate assembly 26 of the vehicle 10. The second imager 76 has a field of view that generally encompasses the rear storage area 20 within the cabin 12 of the vehicle 10. In operation, a dog is initially within the rear storage area 20 of the vehicle 10 while the top and bottom gate panels 36, 38 of the rear gate assembly 26 are open. Next, the dog moves onto the open bottom gate panel 38 from the rear storage area 20. The second imager 76 captures image data of the dog positioned on the open bottom gate panel 38 and transmits the image data to the controller 92. The controller 92 determines the position of the dog based on the image data received from the second imager 76 and prompts movement of the support feature 42 from the retracted position to the deployed position based on the determined position, as illustrated in FIG. 12A. Next, the dog walks down the support feature 42 and onto the ground in the exterior environment 16 of the vehicle 10, and the controller 92 prompts movement of the support feature 42 from the deployed position back to the retracted position, as illustrated in FIG. 12B. The dog subsequently leaves the immediate vicinity of the vehicle 10 and then returns, as illustrated in FIG. 10. As the dog approaches the rear gate assembly 26, the first imager 76 collects image data of the dog, and the at least one radar sensor 88 senses the dog proximate to the bottom gate panel 38. The image data from the first imager 76 and the data from the at least one radar sensor 88 is transmitted to the controller 92. The controller 92 authenticates the identity of the dog by comparing the captured image data with an identity profile stored in memory 100, and the controller 92 determines the position of the dog based on the data received from the at least one radar sensor 88. Next, the controller 92 prompts movement of the support feature 42 from the retracted position to the deployed position based on the authentication of the identity of the dog and the determined position of the dog. The dog is then able to climb onto the support feature 42 and return to the cabin 12 of the vehicle 10, as illustrated in FIG. 11.

Referring now to FIG. 13, a method 114 for providing access to the vehicle 10 is illustrated. The method 114 for providing access to the vehicle 10 may include the step 116 of detecting the living being L with the sensing system 72 of the vehicle 10. In some embodiments, the living being L may be a four-legged being, such as a dog or a cat. As such, the method 114 for providing access to the vehicle 10 may include the step 116 of detecting a four-legged living being L with the sensing system 72 of the vehicle 10. As described above, the sensing system 72 may employ a variety of sensors 74 to sense the four-legged living being L (e.g., imagers 76, radar sensors 88, etc.). In some embodiments, the sensing system 72 may sense the living being L in the exterior environment 16 of the vehicle 10, the cabin 12 of the vehicle 10, and/or the cargo area 18 of the vehicle 10.

The method 114 for providing access to the vehicle 10 may include the step 118 of authenticating the identity of the living being L. The step 118 of authenticating the identity of the living being L may be performed by the controller 92 in response to receiving data from the sensing system 72. The controller 92 may authenticate the identity of the living being L in a variety of manners (e.g., facial recognition, biometric comparison, etc.) as described above, in various implementations. In some embodiments, the step 118 of authenticating the living being L may include the step 120 of determining the size of the living being L. The step 120 of determining the size of the living being L may be performed by the controller 92 via the processing of data received from the sensing system 72. In an exemplary embodiment of the method 114 for providing access to the vehicle 10, at least one imager 76 of the sensing system 72 of the vehicle 10 collects image data of the living being L, and the controller 92 processes that image data to determine the size of the living being L. It is contemplated that a variety of other characteristics of the living being L may be determined in the step 118 of authenticating the identity of the living being L, in some implementations (e.g., color, shape, etc.).

The method 114 for providing access to the vehicle 10 may further include the step 122 of determining the position of the living being L. In some embodiments, the step 122 of determining the position of the living being L may include determining the position of the living being L relative to the vehicle 10 and/or a portion of the vehicle 10. For example, the position of the living being L relative to the rear gate assembly 26 of the vehicle 10 may be determined. In some embodiments, the position of the living being L in the exterior environment 16, the cabin 12, and/or the cargo area 18 of the vehicle 10 may be determined. The position of the living being L may be determined via the controller 92 based on data received from the sensing system 72 of the vehicle 10. As described herein, one or more of a variety of types of sensors 74 of the sensing system 72 may be utilized to determine the position of the living being L.

The method 114 for providing access to the vehicle 10 may further include the step 124 of detecting a gesture of the living being L. The gesture may be detected with the sensing system 72. In some examples, at least one radar sensor 88 of the sensing system 72 coupled to the top gate panel 36 of the rear gate assembly 26 may detect the gesture of the living being L when the living being L is proximate to the rear gate assembly 26 of the vehicle 10. A variety of gestures are contemplated. For example, in some embodiments, wherein the living being L is a human user U of the vehicle 10, the gesture that is detected may be pointing with the user's U hand/or swinging of the user's U foot. In some embodiments, wherein the living being L is a four-legged animal, the gesture that is detected may include standing on the hind legs, jumping, and/or swiping at the air with a front leg.

The method 114 for providing access to the vehicle 10 may further include the step 126 of operating the rear gate assembly 26 of the vehicle 10. The step 126 of operating the rear gate assembly 26 may include movement of at least one closure panel 14 of the rear gate assembly 26 of the vehicle 10 between the open and closed positions and/or movement of the support feature 42 between the retracted and deployed positions. For example, in some embodiments, wherein the rear gate assembly 26 includes the top gate panel 36, the bottom gate panel 38, and the support feature 42 operably coupled to the bottom gate panel 38, the step 126 of operating the rear gate assembly 26 may include at least one of pivoting the top gate panel 36 vehicle-upward from the closed position to the open position, pivoting the top gate panel 36 vehicle-downward from the open position to the closed position, pivoting the bottom gate panel 38 vehicle-downward from the closed position to the open position, pivoting the bottom gate panel 38 vehicle-upward from the open position to the closed position, moving the support feature 42 from the retracted position to the deployed position, and moving the support feature 42 from the deployed position to the retracted position. In some embodiments, the step 126 of operating the rear gate assembly 26 of the vehicle 10 may include at least one of pivoting at least one closure panel 14 of the rear gate assembly 26 vehicle-downward from the closed position to the open position and moving the support feature 42 coupled to the at least one closure panel 14 from the retracted position to the deployed position, wherein, in the open position of the at least one closure panel 14, the position of the support feature 42 in the deployed position is further vehicle-downward than the support feature 42 in the retracted position.

In various embodiments, the step 126 of operating the rear gate assembly 26 of the vehicle 10 may be controlled by the controller 92. In some implementations, the controller 92 may control operation of the rear gate assembly 26 of the vehicle 10 based on authentication of the identity of the living being L, the position of the living being L, and/or based on a detected gesture of the living being L. In some embodiments, the controller 92 may control operation of the rear gate assembly 26 of the vehicle 10 based on the determined size of the living being L. In an exemplary embodiment, the rear gate assembly 26 may be operated based on the size of the living being L and the detected gesture of the living being L.

Figure 14:
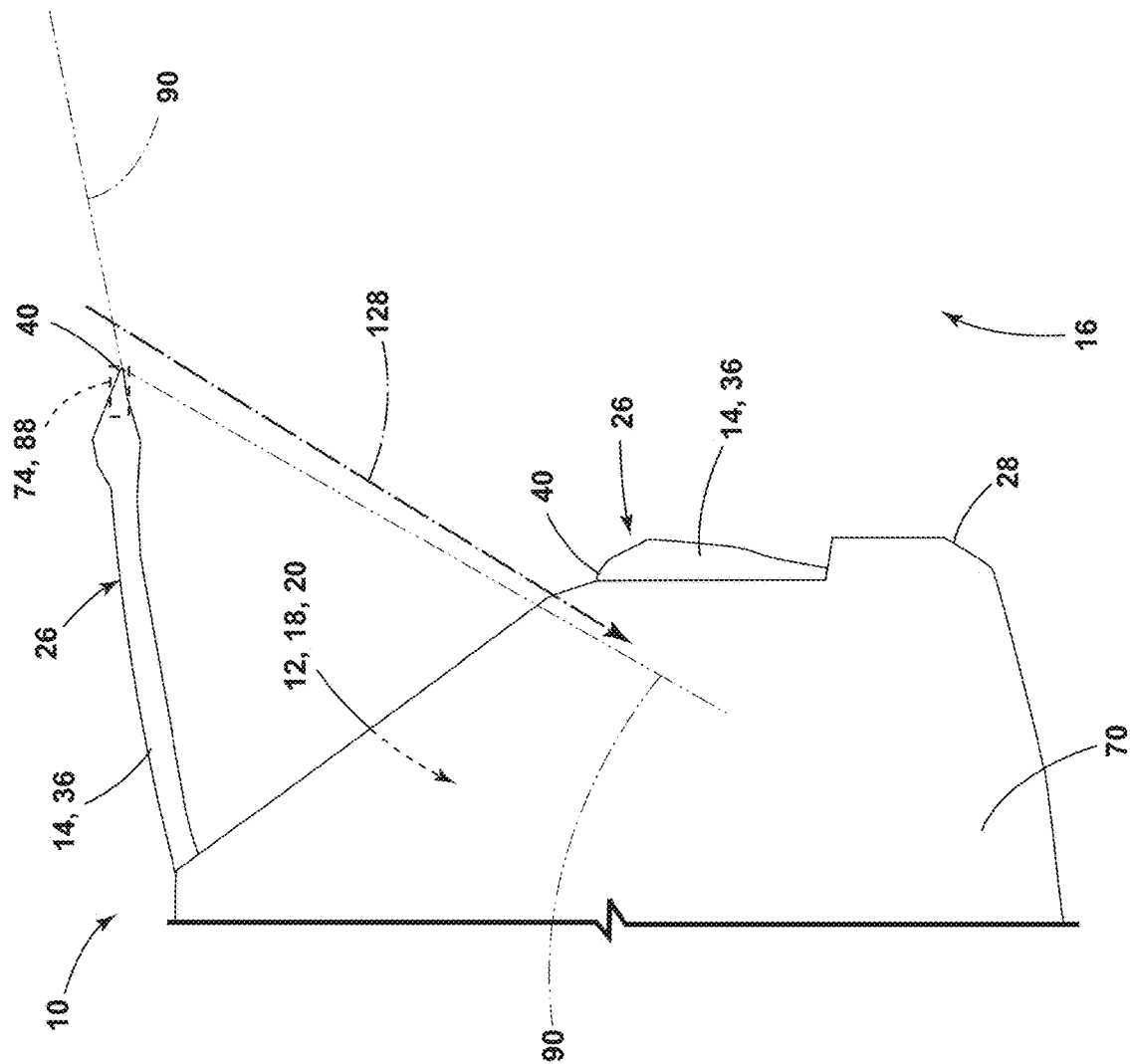
FIG. 14 is an elevational view of a portion of the vehicle, illustrating at least one radar sensor coupled to the top gate panel in a first open position and precipitation entering a cabin of the vehicle, according to one embodiment.
Figure 15:
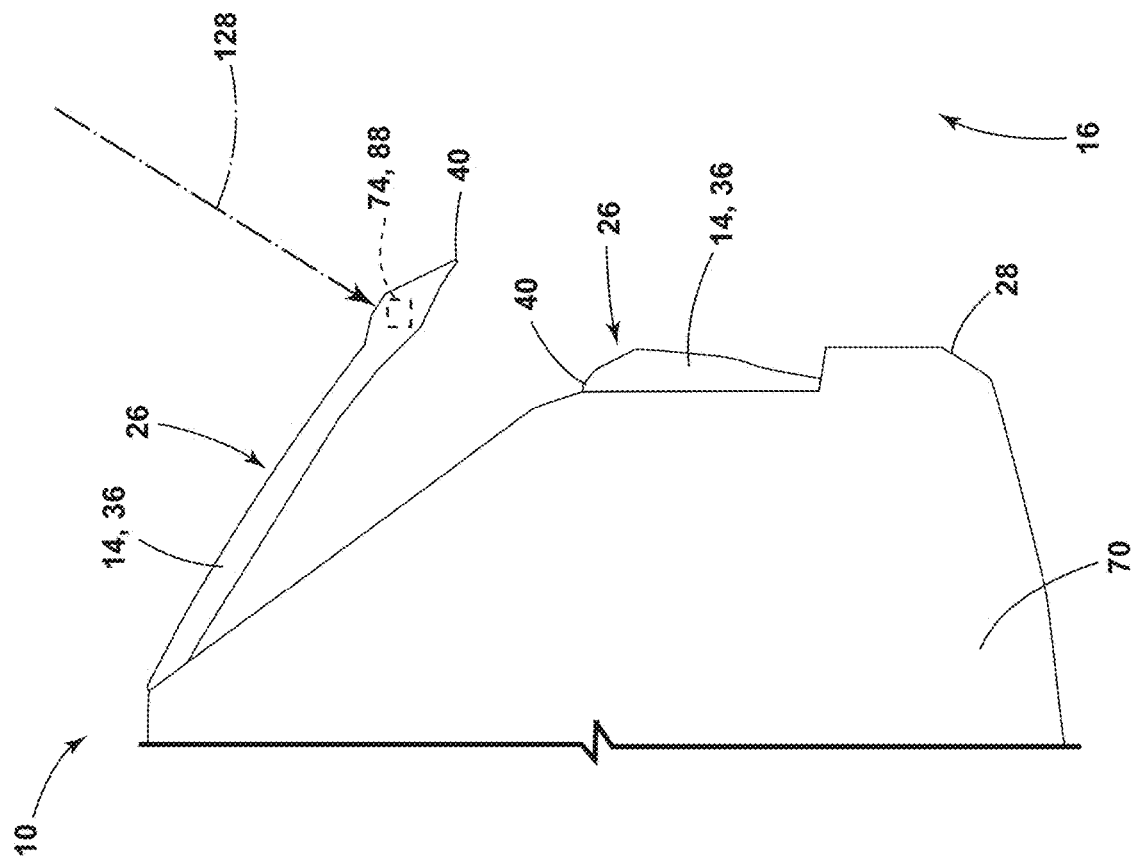
FIG. 15 is an elevational view of a portion of the vehicle, illustrating at least one radar sensor coupled to the top gate panel in a second open position and precipitation contacting the top gate panel, according to one embodiment.

Referring now to FIGS. 14 and 15, in some embodiments, the vehicle 10 includes first and second closure panels 14 that are operable between open and closed positions, and at least one sensor 74 that is coupled to the first closure panel 14 and configured to detect precipitation 128. In such embodiments, the controller 92 may prompt movement of the first closure panel 14 from a first open position to a second open position based on the detected precipitation 128.

Referring still to FIGS. 14 and 15, in some embodiments, the first closure panel 14 may form at least a portion of the rear gate assembly 26 of the vehicle 10. For example, the first closure panel 14 may be a single-door lift gate that pivots to the open position to provide access to the rear storage area 20 positioned within the cabin 12 of the vehicle 10. The second closure panel 14 may be one of a variety of closure panels 14 of the vehicle 10 (e.g., window, side door, sunroof, etc.). In some embodiments, the second closure panel 14 may form at least a portion of the rear gate assembly 26 of the vehicle 10. In an exemplary embodiment, the first and second closure panels 14 may form portions of the rear gate assembly 26, as described further herein.

Referring now to FIGS. 1, 14, and 15, in some implementations, the first closure panel 14 is operable to pivot a first direction about the first pivot axis 32 away from the closed position, and the second closure panel 14 is operable to pivot a second direction about the second pivot axis 34 away from the closed position, wherein the second direction is opposite the first direction. This is the case in the exemplary embodiment illustrated in FIG. 1, wherein the rear gate assembly 26 includes the top gate panel 36 and the bottom gate panel 38 vehicle-downward of the top gate panel 36; the first closure panel 14 comprises the top gate panel 36 and the second closure panel 14 comprises the bottom gate panel 38. In such embodiments, the first and second closure panels 14 are coupled to each other when the first and second closure panels 14 are in the closed positions.

Referring now to FIGS. 14 and 15, at least one sensor 74 that detects the precipitation 128 may be coupled to the first closure panel 14. It is contemplated that the at least one sensor 74 may be at least one of a host of types of sensors 74 configured to detect precipitation 128, in various embodiments. For example, the at least one sensor 74 may be a rain sensor that emits an infrared light beam and detects precipitation 128 by sensing the amount of light that is reflected back to the rain sensor. In some embodiments, the at least one sensor 74 may include at least one radar sensor 88. The at least one radar sensor 88 may emit the radar beam 90, as described herein. In various embodiments, the at least one radar sensor 88 may be operable to detect the precipitation 128 in the exterior environment 16 of the vehicle 10. In some embodiments, the at least one radar sensor 88 may detect the precipitation 128 entering the cabin 12 of the vehicle 10. For example, as illustrated in FIG. 14, the at least one radar sensor 88 coupled to the open first closure panel 14 emits the radar beam 90, such that a portion of the radar beam 90 is emitted into the cabin 12 of the vehicle 10, and a portion of the radar beam 90 is emitted into the exterior environment 16 of the vehicle 10. The at least one radar sensor 88 may detect the precipitation 128 entering the cabin 12 of the vehicle 10 by detecting the precipitation 128 that coincides with the portion of the radar beam 90 that is emitted into the cabin 12 of the vehicle 10. In some embodiments, the at least one radar sensor 88 may be configured to detect the speed and/or direction of the movement of the precipitation 128, as described further herein.

Referring now to FIGS. 2, 14, and 15, the controller 92 may prompt movement of the first closure panel 14 from the first open position to the second open position based on the at least one sensor 74 detecting the precipitation 128. In various embodiments, the controller 92 may prompt movement of the first closure panel 14 from the first open position to the second open position based on the at least one sensor 74 detecting the precipitation 128 entering the cabin 12 of the vehicle 10. In some embodiments, wherein the at least one sensor 74 includes at least one radar sensor 88 operable to emit the radar beam 90 at least partially into the cabin 12 of the vehicle 10, the controller 92 may prompt movement of the first closure panel 14 from the first open position to the second open position based on the detection of the precipitation 128 that coincides with the portion of the radar beam 90 that is emitted into the cabin 12. In some embodiments, wherein the at least one sensor 74 includes at least one radar sensor 88, the controller 92 may prompt movement of the first closure panel 14 from the first open position to the second open position based on the sensed direction of movement of the precipitation 128 and/or the sensed speed of movement of the precipitation 128. In an exemplary embodiment, the at least one radar sensor 88 may detect the direction of movement of the precipitation 128 and transmit corresponding data to the controller 92. The controller 92 may determine that the precipitation 128 is entering the cabin 12 of the vehicle 10 based on the data received from the at least one radar sensor 88 and prompt movement of the first closure panel 14 in response. In various embodiments, the controller 92 may prompt movement of the first closure panel 14 and/or the second closure panel 14 via actuation of one or more actuators 24 operably coupled with the first and/or second closure panels 14.

Referring now to FIGS. 6, 14, and 15, the position of the first closure panel 14 in the first open position may be further than the position of the first closure panel 14 in the second open position from the position of the first closure panel 14 in the closed position. As illustrated in FIG. 15, wherein the first closure panel 14 is the top gate panel 36, the position of the first closure panel 14 in the second open position is between the position of the first closure panel 14 in the first open position (FIG. 14) and the position of the first closure panel 14 in the closed position (FIG. 6). The first closure panel 14 may move toward the closed position from the first open position to the second open position. In various embodiments, the first closure panel 14 is less open in the second open position than the first open position. In some embodiments, the first closure panel 14 may be substantially fully open in the first open position. It is contemplated that the first closure panel 14 may be operable to be actuated into various positions in addition to the first and second open positions, in some implementations. For example, the first closure panel 14 may be operable to enter a position between the first and second open positions and/or a position between the second open position and the closed position, in some embodiments.

It is contemplated that the controller 92 may prompt movement of the first closure panel 14 to the closed position based on detected precipitation 128, detected precipitation 128 entering the cabin 12, detection of precipitation 128 with a portion of the radar beam 90 that is emitted into the cabin 12 of the vehicle 10, the speed of the detected precipitation 128, and/or the direction of the detected precipitation 128, in various embodiments. Further, it is contemplated that the second closure panel 14 may be operable to move between a plurality of open positions and/or the closed position based on detected precipitation 128, detected precipitation 128 entering the cabin 12, detection of precipitation 128 with a portion of the radar beam 90 that is emitted into the cabin 12 of the vehicle 10, the speed of the detected precipitation 128, and/or the direction of the detected precipitation 128.

Referring now to FIGS. 1, 14 and 15, in an exemplary embodiment, the rear gate assembly 26 of the vehicle 10 includes the top gate panel 36, which is operable to pivot vehicle-downward toward the closed position, and the bottom gate panel 38, which is operable to pivot vehicle-upward toward the closed position. The top gate panel 36 is operable between a first open position, as illustrated in FIG. 14, and a second open position that is nearer to the closed position, as illustrated in FIG. 15. At least one radar sensor 88 is coupled to the top gate panel 36 and is configured to emit the radar beam 90. As illustrated in FIG. 14, the at least one radar sensor 88 is configured to emit a portion of the radar beam 90 into the cabin 12 of the vehicle 10 when the top gate panel 36 is in the first open position. In operation of the exemplary embodiment, precipitation 128 in the form of rain is entering the cabin 12 of the vehicle 10 via the access provided by rear gate assembly 26 when the top gate panel 36 is in the first open position and the bottom gate panel 38 is in the closed position. The at least one radar sensor 88 detects the precipitation 128 with the portion of the radar beam 90 that is emitted into the cabin 12 of the vehicle 10 with the top gate panel 36 in the first open position. Data that indicates the precipitation 128 entering the cabin 12 of the vehicle 10 is transmitted from the at least one radar sensor 88 to the controller 92. The controller 92 prompts movement of the top gate panel 36 from the first open position, as illustrated in FIG. 14, to the second open position, as illustrated in FIG. 15, based on the data received from the at least one radar sensor 88. As illustrated in FIG. 15, the precipitation 128 is blocked from entering the cabin 12 of the vehicle 10 by the top gate panel 36 in the second open position. In various embodiments, moving the top gate panel 36 from the first open position to the second open position, as described herein, may advantageously prevent precipitation 128 from entering the cabin 12 of the vehicle 10, while allowing the top gate panel 36 to remain in an open position.

Referring now to FIGS. 1, 14, and 15, in some embodiments, the vehicle 10 includes first and second closure panels 14. The first closure panel 14 is operable between open and closed positions. The cabin 12 of the vehicle 10 is in fluid communication with the exterior environment 16 of the vehicle 10 with the first closure panel 14 in the open position. The second closure panel 14 is operable between open and closed positions. The cabin 12 of the vehicle 10 is in fluid communication with the exterior environment 16 of the vehicle 10 with the second closure panel 14 in the open position. The sensing system 72 of the vehicle 10 is operable to sense the temperature within the cabin 12 of the vehicle 10. The controller 92 prompts movement of the first closure panel 14 toward the closed position based on the sensed temperature within the cabin 12 exceeding a threshold temperature.

Referring still to FIGS. 1, 14, and 15, in various embodiments, the first closure panel 14 and/or the second closure panel 14 may be one of a variety of types of closure panels 14 of the vehicle 10 (e.g., window, side door, sunroof, etc.). In some embodiments, the first closure panel 14 may form at least a portion of the rear gate assembly 26 of the vehicle 10. For example, the first closure panel 14 may be a single-door lift gate that pivots to the open position to provide access to the rear storage area 20 positioned within the cabin 12 of the vehicle 10. In some embodiments, the second closure panel 14 may form at least a portion of the rear gate assembly 26 of the vehicle 10. In an exemplary embodiment, the first and second closure panels 14 may form portions of the rear gate assembly 26, as described further herein.

Referring now to FIGS. 1, 6, 14, and 15, in some implementations, the first closure panel 14 is operable to pivot a first direction about the first pivot axis 32 away from the closed position, and the second closure panel 14 is operable to pivot a second direction about the second pivot axis 34 away from the closed position, wherein the second direction is opposite the first direction. This is the case in the exemplary embodiment illustrated in FIGS. 1 and 6, wherein the rear gate assembly 26 includes the top gate panel 36 and the bottom gate panel 38 vehicle-downward of the top gate panel 36; the first closure panel 14 comprises the top gate panel 36 and the second closure panel 14 comprises the bottom gate panel 38. In such embodiments, the first and second closure panels 14 are coupled to each other when the first and second closure panels 14 are in the closed positions.

As described herein, the sensing system 72 may include at least one sensor 74 that detects the temperature within the cabin 12 of the vehicle 10, such as at least one temperature sensor 94 that is operable to detect the ambient air temperature within the cabin 12 of the vehicle 10. In some embodiments the sensing system 72 may additionally or alternatively include at least one sensor 74 operable to detect the temperature in the exterior environment 16 of the vehicle 10. A variety of types of sensors 74 for detecting temperature are contemplated. In some embodiments, the sensing system 72 may be operable to sense sunlight. For example, as described herein, the sensing system 72 may include at least one optical sensor 96 configured to sense sunlight by converting optical energy into an electric signal that is transmitted to the controller 92. In some embodiments, the sensing system 72 is configured to detect sunlight entering the cabin 12 and/or the cargo area 18 of the vehicle 10. For example, the optical sensor 96 may be positioned within the cabin 12 and/or cargo area 18 of the vehicle 10.

Referring now to FIGS. 1, 2, 14, and 15, in various embodiments, the controller 92 may prompt movement of the first closure panel 14 toward the closed position based on the sensed temperature within the cabin 12 of the vehicle 10. In other words, the sensing system 72 may transmit data to the controller 92 pertaining to the sensed temperature within the vehicle 10, and the controller 92 may prompt movement of the first closure panel 14 based on the received data. In some implementations, the controller 92 may prompt movement of the first closure panel 14 toward the closed position based on the sensed temperature within the cabin 12 exceeding a threshold temperature. For example, in some embodiments, wherein the threshold temperature is 80 degrees Fahrenheit, the controller 92 may prompt movement of the first closure panel 14 based on the sensing system 72 sensing a temperature above 80 degrees Fahrenheit within the cabin 12 of the vehicle 10.

Referring still to FIGS. 2, 14, and 15, in some embodiments, the controller 92 may prompt movement of the first closure panel 14 toward the closed position based on the sensed temperature within the cabin 12 of the vehicle 10 and sensed sunlight entering the cabin 12 of the vehicle 10. In an exemplary embodiment, the controller 92 may prompt movement of the first closure panel 14 toward the closed position based on the sensed temperature within the cabin 12 exceeding the threshold temperature and a sensed amount of sunlight exceeding a sunlight amount threshold.

In various embodiments, the controller 92 may prompt movement of the first closure panel 14 from the first open position toward the closed position based on the sensed temperature and/or sunlight within the cabin 12 of the vehicle 10 and terminate movement of the first closure panel 14 at the second open position between the first open position and the closed position. In other words, the controller 92 may prompt movement of the first closure panel 14 toward the closed position and terminate the movement before the closed position is reached. In some embodiments, the controller 92 may prompt movement of the first closure panel 14 toward the closed position based on the sensed temperature and/or sunlight within the cabin 12 of the vehicle 10 and terminate movement of the first closure panel 14 in the closed position. It is contemplated that, in some embodiments, the second closure panel 14 may be operable to move between a plurality of open positions and/or the closed position based on the sensed temperature and/or sensed amount of sunlight within the cabin 12 of the vehicle 10.

Referring now to FIGS. 1, 2, 14, and 15, in an exemplary embodiment, the rear gate assembly 26 of the vehicle 10 includes the top gate panel 36, which is operable to pivot vehicle-downward toward the closed position, and the bottom gate panel 38, which is operable to pivot vehicle-upward toward the closed position. The top gate panel 36 is operable between a first open position, as illustrated in FIG. 14, and a second open position that is nearer to the closed position, as illustrated in FIG. 15. The sensing system 72 of the vehicle 10 includes at least one sensor 74 operable to sense the temperature within the cabin 12 of the vehicle 10, and at least one sensor 74 operable to detect sunlight entering the cabin 12 of the vehicle 10. In operation of the exemplary embodiment, the top gate panel 36 is initially in the first open position, and sunlight is entering the cabin 12 of the vehicle 10 through the rear gate assembly 26 due to the top gate panel 36 being in the first open position. The sunlight entering the cabin 12 of the vehicle 10 raises the temperature within the cabin 12 of the vehicle 10. The sensing system 72 senses the temperature and amount of sunlight within the cabin 12 and transmits corresponding data to the controller 92. The controller 92 determines that the sensed temperature is above the temperature threshold and that the sensed amount of sunlight is above the sunlight amount threshold. In response, the controller 92 prompts movement of the top gate panel 36 toward the closed position from the first open position to the second open position. In the second open position, the top gate panel 36 shades the cabin 12 from the sunlight that was entering the cabin 12 through the rear gate assembly 26 when the top gate panel 36 was in the first open position. Moving the top gate panel 36 to the second open position in this way may advantageously shade the user U and/or another living being L (e.g., dog, cat, etc.) from incoming sunlight when the temperature within the cabin 12 is higher than desired, while keeping the top gate panel 36 partially open to allow for ventilation of the cabin 12 of the vehicle 10.

Figure 16:
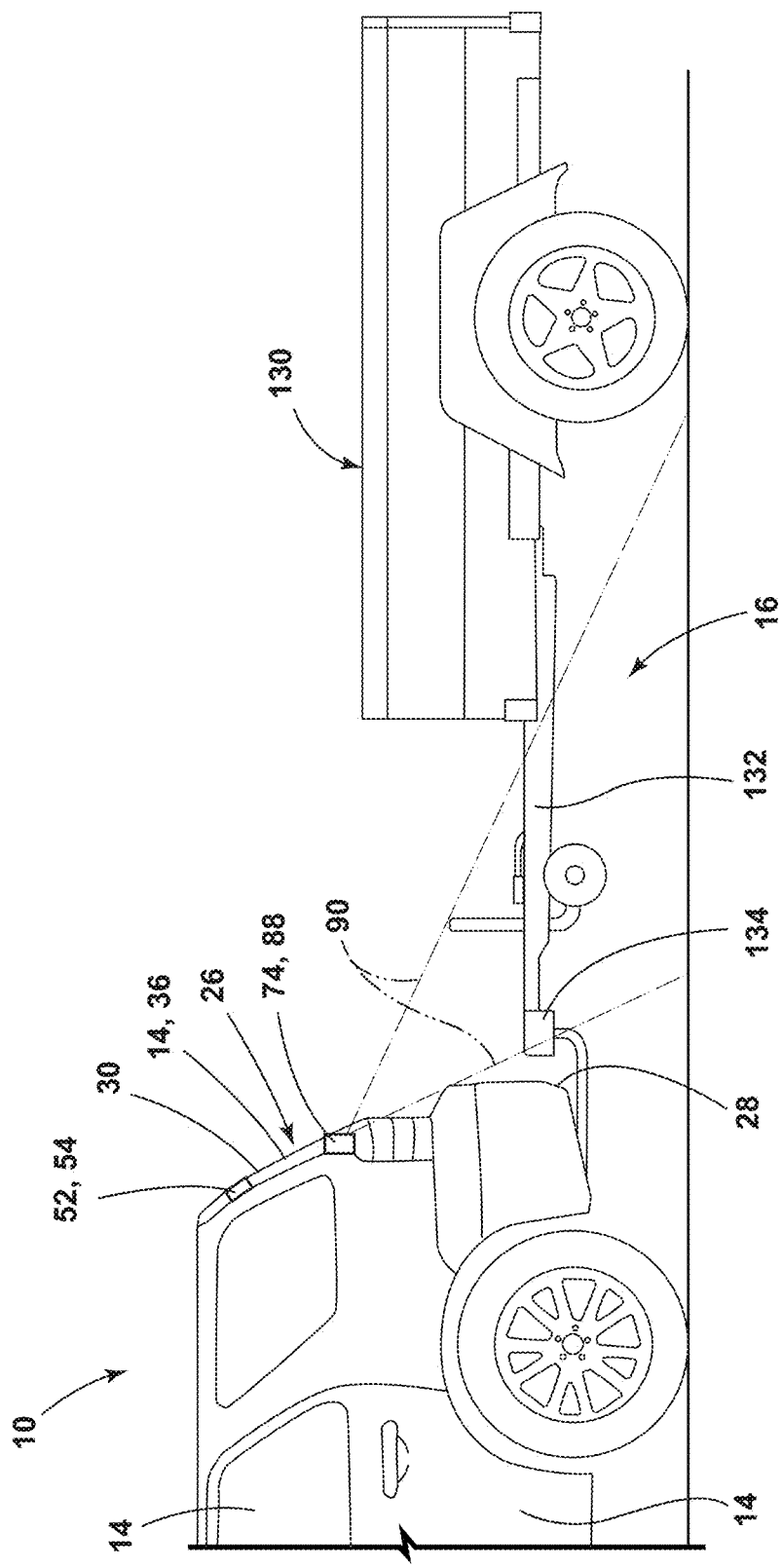
FIG. 16 is an elevational view of a portion of the vehicle and a trailer attached to the vehicle, illustrating at least one sensor coupled to the rear gate assembly of the vehicle, according to one embodiment.

Referring now to FIGS. 2, 16, and 17, the rear gate assembly 26 may include the first closure panel 14, which may be operable between the open position and the closed position. At least one sensor 74 may be coupled to the first closure panel 14. The controller 92 may prompt execution of a security measure in response to the at least one sensor 74 detecting a person within a predetermined proximity of at least a portion of a trailer 130 coupled to the vehicle 10.

The at least one sensor 74 may be at least one of a variety of types of sensors 74, as described herein (e.g., imager 76, radar sensor 88, LIDAR sensor, SONAR sensor, ultrasonic sensor, etc.). In some embodiments, the at least one sensor 74 configured to detect the person within the predetermined proximity with the trailer 130 attached to the vehicle 10 may include at least one imager 76. For example, the at least one sensor 74 may be the rear imager 78 coupled to the rear gate assembly 26 and configured to collect image data of the exterior environment 16 that is vehicle-rearward of the vehicle 10 where the trailer 130 is positioned while attached to the vehicle 10. In some embodiments, the at least one sensor 74 may include at least one radar sensor 88. The at least one radar sensor 88 may be coupled to the rear gate assembly 26 and configured to emit the radar beam 90 vehicle-rearward into the exterior environment 16 of the vehicle 10 where the trailer 130 is positioned while coupled to the vehicle 10. In the embodiment illustrated in FIG. 16, a plurality of radar sensors 88 are coupled to the top gate panel 36 of the rear gate assembly 26 and cooperate together to form imaging radar, which is used by the controller 92 to determine the proximity of the person relative to at least a portion of the trailer 130, as described further herein. Various types of sensors 74 configured to determine the proximity of the person to the trailer 130 attached to the vehicle 10 are contemplated.

In various embodiments, the controller 92 may prompt execution of the security measure in response to the at least one sensor 74 detecting the person within the predetermined proximity of at least a portion of the trailer 130. In some implementations, the controller 92 may prompt execution of the security measure in response to the at least one sensor 74 detecting the person within the predetermined proximity of any portion of the trailer 130. In some embodiments, the controller 92 may prompt execution of the security measure based on the at least one sensor 74 detecting the person within the predetermined proximity of a tongue 132 of the trailer 130. In some embodiments, the controller 92 may prompt execution of the security measure in response to the at least one sensor 74 detecting the person within the predetermined proximity of a coupler assembly 134 of the trailer 130 and/or one or more components of the coupler assembly 134 (e.g., latch, ball socket, etc.). In an exemplary embodiment, the at least one sensor 74 may detect the person within the predetermined proximity (e.g., three inches) of the coupler assembly 134 of the trailer 130 and transmit the data to the controller 92. The controller 92 may prompt execution of the security measure based on the received data.

Referring now to FIGS. 2, 16, and 17, the controller 92 may be configured to prompt execution of at least one of a variety of types of security measures in response to the at least one sensor 74 detecting the person within the predetermined proximity of at least the portion of the trailer 130. In some embodiments, execution of the security measure may include activation of at least one imager 76 coupled to the vehicle 10. In some embodiments, execution of the security measure may include transmission of an alert to the portable electronic device 56. For example, the controller 92 may transmit an alert signal to the smartphone of the user U, which may emit an audible, tactile, and/or visual alert in response. In some implementations, execution of the security measure may include emission of an audible alert by the vehicle 10. The sound source device 52 of the vehicle 10 may emit the audible alert. For example, an alarm of the vehicle 10 may be sounded and/or a horn of the vehicle 10 may be activated. In an exemplary embodiment, the execution of the security measure may include emission of the audible alert by the sound exciter 54 coupled to the rear glass panel 30 of the rear gate assembly 26. In some embodiments, the sound exciter 54 and/or another sound source device 52 of the vehicle 10 may issue a voice alert. For example, the sound exciter 54 may issue a voice alert that gives an instruction and/or provides information, such as "back away from the vehicle," "you are under video surveillance," and/or "law enforcement has been alerted." A variety of voice alerts are contemplated. A variety of additional or alternative security measures are also contemplated. For example, execution of the security measure may include contacting local law enforcement and/or another party, such as the user U.

Referring to FIGS. 2, 16, and 17, in an exemplary embodiment, the trailer 130 is coupled with the vehicle 10. The rear gate assembly 26 of the vehicle 10 includes the top gate panel 36, which is operable to pivot vehicle-downward toward the closed position, and the bottom gate panel 38, which is operable to pivot vehicle-upward toward the closed position. At least one radar sensor 88 operable to detect a person in proximity with the trailer 130 attached to the vehicle 10 is coupled to the top gate panel 36 of the rear gate assembly 26. In operation of the exemplary embodiment, the person walks toward the trailer 130 and reaches down toward the coupler assembly 134 of the trailer 130. The at least one radar sensor 88 senses the proximity of the person to the coupler assembly 134 of the trailer 130 and transmits corresponding data to the controller 92. In response to receiving the data indicating that the person is within a predetermined proximity to the coupler assembly 134 of the trailer 130, the controller 92 prompts execution of a plurality of security measures. Namely, the controller 92 prompts activation of at least one imager 76 of the vehicle 10, such that the person in proximity with the coupler assembly 134 of the trailer 130 is recorded by the at least one imager 76. Further, the controller 92 prompts the sound exciter 54 coupled to the rear glass panel 30 disposed within the top gate panel 36 of the rear gate assembly 26 to emit an audible voice alert, which states "you are under video surveillance."

Simultaneously, the controller 92 prompts an alert signal to be transmitted to the portable electronic device 56 of the user U to alert the user U of the person in proximity with the coupler assembly 134 of the trailer 130.

In some embodiments, wherein at least one radar sensor 88 is coupled to the vehicle 10, the controller 92 may prompt adjustment of the beam width of the radar beam 90 emitted by the at least one radar sensor 88 from a first radar beam width to a second radar beam width based on a determination that the trailer 130 is connected to the vehicle 10. In some implementations, the first radar beam width may be greater than the second radar beam width. In other words, the controller 92 may prompt adjustment of the beam width based on the determination that the trailer 130 is coupled to the vehicle 10, such that the beam width decreases. It is contemplated that a determination that the trailer 130 is connected to the vehicle 10 may be made in a variety of manners. For example, the sensing system 72 may sense, via one or more sensors 74, that the trailer 130 is connected to the vehicle 10. In some embodiments, the controller 92 may receive an input in the form of an electric signal from an electrical connector that electrically connects the trailer 130 and the vehicle 10. The electric signal may indicate that the trailer 130 is connected to the vehicle 10.

In some embodiments, the controller 92 may prompt adjustment of the beam width of the radar beam 90 based on a variety of inputs and/or determinations in addition to the determination that the trailer 130 is connected to the vehicle 10. For example, in some embodiments, the controller 92 may prompt adjustment of the beam width of the radar beam 90 based on a determination that the trailer 130 is connected to the vehicle 10 and based on the vehicle 10 being in park. In some embodiments, the controller 92 may prompt adjustment of the beam width based on a determination that the trailer 130 is connected to the vehicle 10 and based on a user input received from the HMI 58. A variety of inputs and/or determinations are contemplated.

Referring now to FIG. 2, the vehicle 10 may be operable to enter at least one reverse mode, wherein the vehicle 10 is configured to travel in reverse. In some embodiments, the vehicle 10 enters the reverse mode via shifting into a reverse gear of the vehicle 10. For example, in a vehicle 10 that includes an internal combustion engine, the reverse mode of the vehicle 10 may be entered by shifting into the reverse gear. In some embodiments, the vehicle 10 enters the reverse mode via switching one or more electric motors of the vehicle 10 into reverse, such that operation of the one or more electric motors is configured to move the vehicle 10 in reverse. For example, in an electric vehicle, the reverse mode of the vehicle 10 may be entered by switching the electric motor into reverse. In some embodiments, the vehicle 10 enters the reverse mode via activation of a reverse assistance system 136 of the vehicle 10. For example, in some implementations, the reverse mode of the vehicle 10 may be entered by activating a hitching assistance system 138 of the vehicle 10 for aligning and/or connecting the vehicle 10 with the trailer 130. In some embodiments, the reverse mode of the vehicle 10 may be entered by activating a trailer reverse assistance system 140 of the vehicle 10 that provides assistance in reversing the vehicle 10 with the trailer 130 coupled thereto. Further, in some embodiments, the reverse mode of the vehicle 10 may be entered by activating a parking assistance system 142 of the vehicle 10 that provides assistance in maneuvering the vehicle 10 in a reverse direction to park the vehicle 10.

It is contemplated that the one or more reverse assistance systems 136 of the vehicle 10 may be manual, semi-autonomous, and/or autonomous assistance systems. For example, in some embodiments, the reverse assistance system 136 of the vehicle 10 may be a manual trailer reversing assistance system, such as Ford Motor Company's Trailer Reverse Guidance® system, which provides information to the driver of the vehicle to assist the driver in manually reversing a vehicle-trailer combination. Further, in some embodiments, the reverse assistance system 136 of the vehicle 10 may be a semi-autonomous trailer reversing assistance system, such as Ford Motor Company's Pro Trailer Backup Assist® system, which controls movement of a vehicle steering wheel based on inputs from a knob controlled by the operator of the vehicle.

In reference to FIGS. 2, 18, and 19, in some embodiments, the input option 66 on the HMI 58 may be made accessible for selection by the user U in response to the vehicle 10 entering the reverse mode. For example, as illustrated in FIGS. 18 and 19, wherein the HMI 58 includes the display 60 of the vehicle 10 configured as the touchscreen 64, the vehicle 10 entering the reverse mode may prompt the HMI 58 to display a selectable input option 66 that was not displayed prior to the vehicle 10 entering the reverse mode. It is contemplated that the input option 66 may be made indirectly accessible in response to the vehicle 10 entering the reverse mode, in some embodiments. For example, the HMI 58 may display a selectable menu icon in response to the reverse mode being entered, wherein selection of the menu icon prompts the HMI 58 to display the selectable input option 66. Various HMI 58 types are contemplated. For example, as described herein, the HMI 58 may be the portable electronic device 56.

Referring still to FIGS. 2, 18 and 19, selection of the input option 66 by the user U may cause the HMI 58 to transmit the user input to the controller 92. In various embodiments, the controller 92 may prompt one or more of a variety of types of vehicle 10 and/or exterior component actions in response to receiving the user input and/or in response to the vehicle 10 entering the reverse mode. In some embodiments, the controller 92 may prompt pairing of the sound source device 52 and the microphone 68, such that the sound source device 52 emits sound corresponding to the sound detected by the microphone 68. As described herein, the microphone 68 and/or the sound source device 52 may be coupled to various portions of the vehicle 10 (e.g., cabin 12, exterior 70, etc.) and/or may be integrated with one or more portable electronic devices 56. For example, in some embodiments, the microphone 68 may be disposed within the cabin 12 and coupled to an overhead console of the vehicle 10, and the sound source device 52 may be the sound exciter 54 coupled to the rear glass panel 30 that is disposed in the rear gate assembly 26 of the vehicle 10. In such embodiments, the microphone 68 may detect the voice of the user U driving the vehicle 10, and the sound exciter 54 may emit sound corresponding with the detected voice, such that the user's U voice may be heard in the exterior environment 16 of the vehicle 10 proximate to the rear gate assembly 26.

In some embodiments, a plurality of microphones 68 may be paired with a plurality of corresponding sound source devices 52. In an exemplary embodiment, a first smartphone is connected with a first microphone 68 of the vehicle 10 and a first sound source device 52 of the vehicle 10 via Bluetooth®. A second smartphone in the exterior environment 16 of the vehicle 10 includes a second microphone 68 and a second sound source device 52. In operation, the user U causes the vehicle 10 to enter the reverse mode by shifting the vehicle 10 into the reverse gear. In response, the HMI 58 of the vehicle 10 displays the selectable input option 66 that, when selected, prompts the first smartphone to be paired (via, e.g., voice call, video conference, etc.) with the second smartphone, such that the first microphone 68 is paired with the second sound source device 52, and the second microphone 68 is paired with the first sound source device 52. In various embodiments, pairing the microphone 68 with the sound source device 52 may allow the user U within the cabin 12 of the vehicle 10 to conveniently communicate with a spotter or other person in the exterior environment 16 of the vehicle 10 during a reverse maneuver of the vehicle 10.

Referring now to FIGS. 2 and 16-19, in some embodiments, the controller 92 may prompt movement of at least one closure panel 14 of the vehicle 10 from the closed position to the open position in response to the vehicle 10 entering the reverse mode and/or receiving the user input. The at least one closure panel 14 may be at least a portion of the rear gate assembly 26. In some implementations, the at least one closure panel 14 may include the rear glass panel 30 of the rear gate assembly 26. In an exemplary embodiment illustrated in FIGS. 16 and 17, the rear glass panel 30 of the rear gate assembly 26 of the vehicle 10 is operable between open and closed positions. In operation, the user U causes the vehicle 10 to enter the reverse mode by activating the hitching assistance system 138 of the vehicle 10. Upon activation of the hitching assistance system 138, the HMI 58 makes the input option 66 accessible for selection by the user U, as illustrated in FIG. 19. Next, the user U selects the input option 66, and the user input is transmitted from the HMI 58 to the controller 92. In response to receiving the user input, the controller 92 prompts movement of the rear glass panel 30 from the closed position to the open position. In another embodiment, the controller 92 may prompt the rear glass panel 30 to move from the closed position to the open position in response to the vehicle 10 entering the reverse mode, rather than in response to receiving the user input from the HMI 58.

Movement of the at least one closure panel 14 from the closed position to the open position in response to at least one of the vehicle 10 entering the reverse mode and the controller 92 receiving the user input from the HMI 58 may allow for convenient communication between the user U within the vehicle 10 and a spotter or other person in the exterior environment 16 of the vehicle 10 during a reverse maneuver of the vehicle 10.

Figure 20:
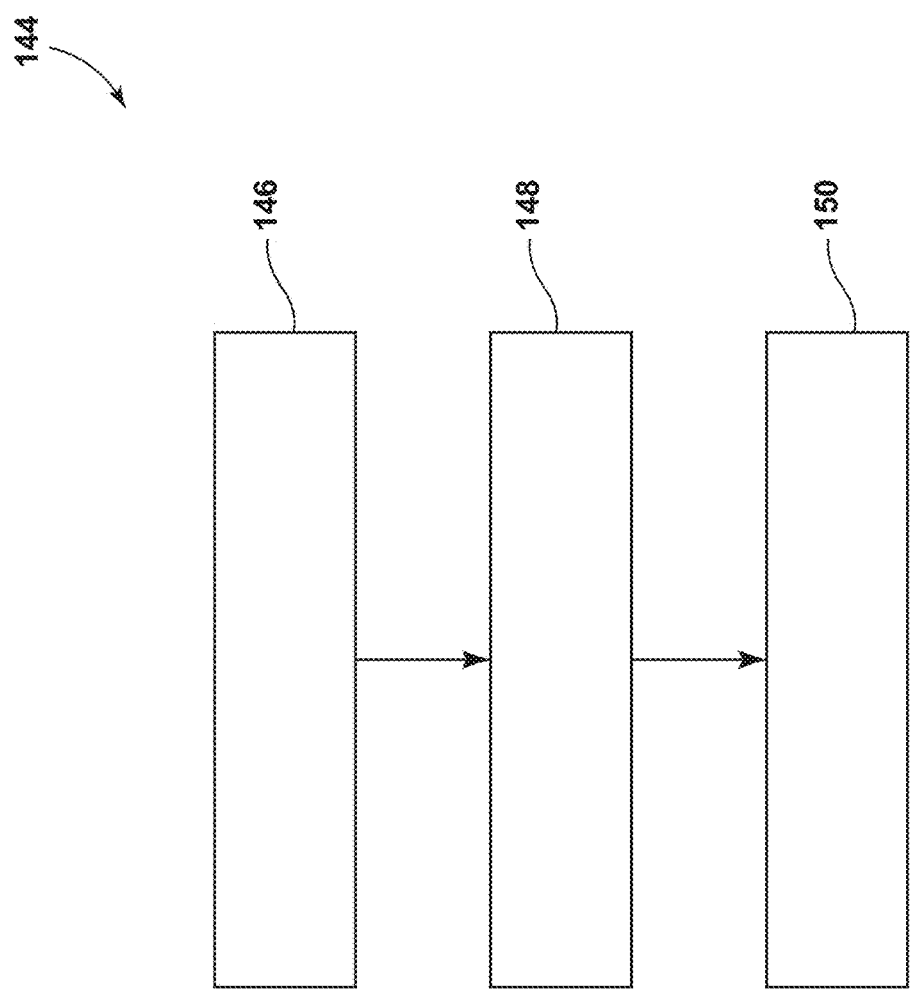
FIG. 20 is a block diagram illustrating a method of operating a system for the vehicle, according to one embodiment.

Referring now to FIG. 20, a method 144 of operating the system 50 for the vehicle 10 is illustrated. The method 144 of operating the system 50 for the vehicle 10 may include the step of entering the reverse mode of the vehicle 10. As described herein, the step 146 of entering the reverse mode of the vehicle 10 may be performed in at least one of a variety of manners. In some embodiments, the step 146 of entering the reverse mode of the vehicle 10 may include shifting into a reverse gear of the vehicle 10. For example, in a vehicle 10 that includes an internal combustion engine, the reverse mode of the vehicle 10 may be entered by shifting into the reverse gear. In some embodiments, the step 146 of entering the reverse mode of the vehicle 10 may include switching one or more electric motors of the vehicle 10 into reverse, such that operation of the one or more electric motors is configured to move the vehicle 10 in reverse. In some embodiments, the step 146 of entering the reverse mode of the vehicle 10 may include activation of the reverse assistance system 136 of the vehicle 10. As described herein, a variety of reverse assistance systems 136 are contemplated (e.g., hitching assistance system 138, trailer reverse assistance system 140, parking assistance system 142, etc.).

Referring still to FIG. 20, the method 144 of operating the system 50 for the vehicle 10 may further include the step 148 of power actuating at least one closure panel 14 of the vehicle 10 from the closed position to the open position. In various embodiments, the at least one closure panel 14 of step 148 may form at least a portion of the rear gate assembly 26 of the vehicle 10. In some embodiments, the at least one closure panel 14 may include the rear glass panel 30 of the vehicle 10. It is contemplated that the at least one closure panel 14 of step 148 may be at least one of a variety of types of closure panels 14 of the vehicle 10, as described herein. In various embodiments, a plurality of closure panels 14 may be power actuated from closed to open positions. Further, it is contemplated that the at least one closure panel 14 may be power actuated via operation of one or more actuators 24 coupled to the vehicle 10.

In some embodiments, the step 148 of power actuating at least one closure panel 14 from the closed position to the open position may be performed in response to at least one of the vehicle 10 entering the reverse mode and the controller 92 receiving the user input entered into the HMI 58 via selection of the input option 66 by the user U, wherein the input option 66 is made accessible for selection by the user U in response to the vehicle 10 entering the reverse mode. For example, in some embodiments, the method 144 of operating the system 50 for the vehicle 10 may include the step 148 of power actuating at least one closure panel 14 of the vehicle 10 from the closed position to the open position in response to the vehicle 10 entering the reverse mode. Further, in some embodiments, the method 144 of operating the system 50 of the vehicle 10 may include the step 148 of power actuating at least one closure panel 14 of the vehicle 10 from the closed position to the open position in response to receiving the user input entered into the HMI 58 via selection of the input option 66 by the user U, wherein the input option 66 is made accessible for selection by the user U in response to the vehicle 10 entering the reverse mode.

Referring still to FIG. 20, in some embodiments, the method 144 of operating the system 50 for the vehicle 10 may include the step 150 of pairing the sound source device 52 and the microphone 68. In various embodiments, the sound source device 52 is configured to emit sound corresponding to sound detected by the microphone 68 when the microphone 68 and sound source device 52 are paired with each other. As described herein, the microphone 68 and/or the sound source device 52 may be coupled to various portions of the vehicle 10 and/or may be integrated with one or more portable electronic devices 56.

In some embodiments, the step 150 of pairing the sound source device 52 and the microphone 68 may be performed in response to at least one of the vehicle 10 entering the reverse mode and the controller 92 receiving the user input entered into the HMI 58 via selection of the input option 66 by the user U, wherein the input option 66 is made accessible for selection by the user U in response to the vehicle 10 entering the reverse mode. For example, in some embodiments, the method 144 of operating the system 50 for the vehicle 10 may include the step 150 of pairing the sound source device 52 and the microphone 68 in response to the vehicle 10 entering the reverse mode. Further, in some embodiments, the method 144 of operating the system 50 of the vehicle 10 may include the step 150 of pairing the sound source device 52 and the microphone 68 in response to receiving the user input entered into the HMI 58 via selection of the input option 66 by the user U, wherein the input option 66 is made accessible for selection by the user U in response to the vehicle 10 entering the reverse mode.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A system for a vehicle, comprising:
a rear gate assembly of the vehicle that includes a closure panel operable to pivot vehicle-downward from a closed position to an open position;
a support feature coupled to the closure panel and operable to move relative to the closure panel between a retracted position and a deployed position, wherein, in the open position of the closure panel, the position of the support feature in the deployed position is further vehicle-downward than the position of the support feature in the retracted position;
a sensing system of the vehicle that detects a living being proximate to the rear gate assembly; and
a controller that authenticates an identity and determines a position of the living being based on data received from the sensing system and prompts movement of the support feature from the retracted position to the deployed position based on the authenticated identity and determined position of the living being.

2. The system of claim 1, wherein the support feature comprises:
a ramp that extends out of the closure panel from the retracted position to the deployed position.

3. The system of claim 1, wherein the rear gate assembly includes a top gate panel that is operable to pivot vehicle-upward from a closed position to an open position and a bottom gate panel, wherein the closure panel is the bottom gate panel.

4. The system of claim 3, wherein the sensing system comprises:
at least one radar sensor coupled to the top gate panel, wherein the controller determines the position of the living being based on data received from the at least one radar sensor.

5. The system of claim 1, wherein the sensing system comprises:
an imager coupled to the rear gate assembly, wherein the controller authenticates the identity of the living being based on data received from the imager.

6. The system of claim 1, wherein the sensing system comprises:
an imager disposed within a cabin of the vehicle, wherein the controller authenticates the identity of the living being based on data received from the imager.

7. The system of claim 1, wherein the controller further prompts movement of the support feature from the deployed position to the retracted position based on the position of the living being.

8. A system for a vehicle, comprising:
a closure panel operable to pivot vehicle-downward from a closed position to an open position;
a support feature coupled to the closure panel and operable to move relative to the closure panel between a retracted position and a deployed position, wherein, in the open position of the closure panel, the position of the support feature in the deployed position is further vehicle-downward than the position of the support feature in the retracted position;
a sensing system of the vehicle that detects a living being proximate to the vehicle; and
a controller that determines a position of the living being based on data received from the sensing system and prompts movement of the support feature from the retracted position to the deployed position based on the determined position of the living being.

9. The system of claim 8, wherein the controller prompts movement of the support feature from the retracted position to the deployed position based on the determined position of the living being within a cabin of the vehicle.

10. The system of claim 8, wherein the support feature comprises:
a ramp that extends out of the closure panel from the retracted position to the deployed position.

11. The system of claim 8, wherein the vehicle comprises a rear gate assembly that includes a top gate panel that is operable to pivot vehicle-upward from a closed position to an open position and a bottom gate panel, wherein the closure panel is the bottom gate panel.

12. The system of claim 11, wherein the sensing system comprises:
at least one radar sensor coupled to the top gate panel, wherein the controller determines the position of the living being based on data received from the at least one radar sensor.

13. The system of claim 8, wherein the sensing system comprises:
an imager coupled to a rear gate assembly, wherein the controller determines the position of the living being based on data received from the imager.

14. The system of claim 8, wherein the sensing system comprises:
an imager disposed within a cabin of the vehicle, wherein the controller determines the position of the living being based on data received from the imager.

15. A method for providing access to a vehicle, comprising the steps of:
detecting a four-legged living being with a sensing system of the vehicle;
determining a size of the living being; and
operating a rear gate assembly of the vehicle based on the determined size of the living being.

16. The method of claim 15, wherein the step of operating a rear gate assembly of the vehicle comprises at least one of:
pivoting a closure panel of the rear gate assembly vehicle-downward from a closed position to an open position; and
moving a support feature coupled to the closure panel from a retracted position to a deployed position, wherein, in the open position of the closure panel, the position of the support feature in the deployed position is further vehicle-downward than the position of the support feature in the retracted position.

17. The method of claim 16, wherein the support feature comprises:
a ramp that extends out of the closure panel from the retracted position to the deployed position.

18. The method of claim 15, wherein the rear gate assembly includes a top gate panel operable to pivot about a first pivot axis between open and closed positions, wherein the top gate panel pivots a first direction about the first pivot axis from the closed position to the open position, and a bottom gate panel operable to pivot about a second pivot axis between open and closed positions, wherein the bottom gate panel pivots a second direction about the second pivot axis from the closed position to the open position, wherein the second direction is opposite the first direction; and wherein the sensing system includes at least one radar sensor coupled to the top gate panel.

19. The method of claim 15, further comprising the step of:
determining the position of the living being, wherein the rear gate assembly is operated based on the size of the living being and the position of the living being.

20. The method of claim 15, further comprising the step of:
detecting a gesture of the living being, wherein the rear gate assembly is operated based on the size of the living being and the detected gesture of the living being.

* * * * *